(12) United States Patent
Braun et al.

(10) Patent No.: US 6,411,276 B1
(45) Date of Patent: Jun. 25, 2002

(54) HYBRID CONTROL OF HAPTIC FEEDBACK FOR HOST COMPUTER AND INTERFACE DEVICE

(75) Inventors: Adam C. Braun, Sunnyvale; Kenneth M. Martin, Palo Alto; Louis B. Rosenberg, San Jose, all of CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 09/687,744

(22) Filed: Oct. 13, 2000

Related U.S. Application Data

(63) Continuation-in-part of application No. 09/322,245, filed on May 28, 1999, now Pat. No. 6,275,439, which is a continuation of application No. 08/747,841, filed on Nov. 13, 1996, now Pat. No. 5,959,613.
(60) Provisional application No. 60/160,401, filed on Oct. 19, 1999, and provisional application No. 60/221,496, filed on Jul. 27, 2000.

(51) Int. Cl.[7] ................................................. G09G 5/00
(52) U.S. Cl. ......................... 345/156; 345/157; 345/701
(58) Field of Search .......................... 345/700, 701, 345/702, 156, 157, 158, 159, 160, 161, 162, 168, 173

(56) References Cited

U.S. PATENT DOCUMENTS

| | | | |
|---|---|---|---|
| 2,832,073 A | 11/1954 | Arkus et al. ................. 345/161 |
| 3,659,284 A | 4/1972 | Rusch ........................ 345/161 |
| 3,863,098 A | 1/1975 | Mehr ......................... 345/161 |
| 3,919,691 A | 11/1975 | Noll ......................... 340/172.5 |
| 4,398,889 A | 8/1983 | Lam et al. .................... 434/45 |
| 4,414,984 A | 11/1983 | Zarudiansky ................. 128/774 |
| 4,477,043 A | 10/1984 | Repperger ................... 244/223 |
| 4,560,983 A | 12/1985 | Williams .................... 340/825 |
| 4,604,016 A | 8/1986 | Joyce ........................... 414/7 |
| 4,706,294 A | 11/1987 | Ouchida ...................... 381/109 |
| 4,769,763 A | 9/1988 | Trieb et al. ................... 364/559 |

(List continued on next page.)

FOREIGN PATENT DOCUMENTS

| | | |
|---|---|---|
| EP | 0085518 A1 | 8/1983 |
| EP | 0265011 | 4/1988 |
| EP | 0607580 A1 | 7/1994 |
| EP | 0626634 A2 | 11/1994 |

(List continued on next page.)

OTHER PUBLICATIONS

Kilpatrick, Jerome; "The Use Of A Kinesthetic Supplement In An Interactive Graphics System", pp. 1–52, 1976.*

Kelley, A.J. et al., "MagicMouse: Tactile and Kinesthetic Feedback in the Human–Computer Interface Using an Electromagnetically Actuated Input/Output Device,"Dept. of Elec. Engineering, Univ. of British Columbia, 1993, pp. 1–27.

(List continued on next page.)

*Primary Examiner*—Xiao Wu
(74) *Attorney, Agent, or Firm*—James R. Riegel; Paul M. Thyfault

(57) ABSTRACT

A hybrid haptic feedback system in which a host computer and haptic feedback device share processing loads to various degrees in the output of haptic sensations, and features for efficient output of haptic sensations in such a system. A haptic feedback interface device in communication with a host computer includes a device microcontroller outputting force values to the actuator to control output forces. In various embodiments, the microcontroller can determine force values for one type of force effect while receiving force values computed by the host computer for a different type of force effect. For example, the microcontroller can determine closed loop effect values and receive computed open loop effect values from the host; or the microcontroller can determine high frequency open loop effect values and receive low frequency open loop effect values from the host. Various features allow the host to efficiently stream computed force values to the device.

54 Claims, 4 Drawing Sheets

U.S. PATENT DOCUMENTS

| | | | |
|---|---|---|---|
| 4,800,721 A | 1/1989 | Cemenska et al. | 60/393 |
| 4,823,634 A | 4/1989 | Culver | 74/471 XY |
| 4,868,549 A | 9/1989 | Affinito et al. | 340/710 |
| 4,907,970 A | 3/1990 | Meenan, Jr. | 434/45 |
| 4,935,728 A | 6/1990 | Kley | 340/709 |
| 4,949,119 A | 8/1990 | Moncrief et al. | 364/578 |
| 4,961,038 A | 10/1990 | MacMinn | 318/696 |
| 4,961,138 A | 10/1990 | Gorniak | 364/200 |
| 4,983,901 A | 1/1991 | Lehmer | 318/685 |
| 5,012,231 A | 4/1991 | Felsenstein | 345/161 |
| 5,044,956 A | 9/1991 | Behensky et al. | 434/45 |
| 5,076,517 A | 12/1991 | Ferranti et al. | 244/228 |
| 5,103,404 A | 4/1992 | McIntosh | 318/568.22 |
| 5,107,080 A | 4/1992 | Rosen | 200/6 A |
| 5,116,180 A | 5/1992 | Fung et al. | 414/5 |
| 5,146,566 A | 9/1992 | Hollis, Jr. et al. | 395/275 |
| 5,153,884 A | 10/1992 | Lucak et al. | 371/32 |
| 5,184,319 A | 2/1993 | Kramer | 364/806 |
| 5,185,561 A | 2/1993 | Good et al. | 318/432 |
| 5,186,629 A | 2/1993 | Rohen | 434/114 |
| 5,197,003 A | 3/1993 | Moncrief et al. | 364/410 |
| 5,203,563 A | 4/1993 | Loper, III | 273/148 B |
| 5,220,260 A | 6/1993 | Schuler | 318/561 |
| 5,223,776 A | 6/1993 | Radke et al. | 318/568.1 |
| 5,243,266 A | 9/1993 | Kasagami et al. | 318/568.1 |
| 5,264,768 A | 11/1993 | Gregory et al. | 318/561 |
| 5,280,276 A | 1/1994 | Kwok | 345/167 |
| 5,286,203 A | 2/1994 | Fuller et al. | 434/45 |
| 5,289,273 A | 2/1994 | Lang | 348/121 |
| 5,296,871 A | 3/1994 | Paley | 345/163 |
| 5,354,162 A | 10/1994 | Burdea et al. | 414/5 |
| 5,396,266 A | 3/1995 | Brimhall | 345/161 |
| 5,405,152 A | 4/1995 | Katanics et al. | 273/438 |
| 5,412,880 A | 5/1995 | Raab | 33/503 |
| 5,414,337 A | 5/1995 | Schuler | 318/561 |
| 5,428,748 A | 6/1995 | Davidson et al. | 395/275 |
| 5,429,140 A | 7/1995 | Burdea et al. | 128/774 |
| 5,451,924 A | 9/1995 | Massimino et al. | 340/407.1 |
| 5,482,051 A | 1/1996 | Reddy et al. | 128/733 |
| 5,512,919 A | 4/1996 | Araki | 345/156 |
| 5,513,100 A | 4/1996 | Parker et al. | 364/167.01 |
| 5,517,507 A | 5/1996 | Needham et al. | 371/32 |
| 5,565,840 A | 10/1996 | Thorner et al. | 340/407.1 |
| 5,589,828 A | 10/1996 | Armstrong | 341/20 |
| 5,576,727 A | 11/1996 | Rosenberg et al. | 345/179 |
| 5,623,582 A | 4/1997 | Rosenberg | 395/99 |
| 5,625,576 A | 4/1997 | Massie et al. | 364/578 |
| 5,629,594 A | 5/1997 | Jacobus et al. | 318/568.11 |
| 5,634,794 A | 6/1997 | Hildreth et al. | 434/37 |
| 5,642,469 A | 6/1997 | Hannaford et al. | 395/99 |
| 5,643,087 A | 7/1997 | Marcus et al. | 463/38 |
| 5,666,138 A | 9/1997 | Culver | 345/161 |
| 5,680,322 A | 10/1997 | Shinoda | 364/514 A |
| 5,684,722 A | 11/1997 | Thorner et al. | 364/578 |
| 5,691,898 A | 11/1997 | Rosenberg et al. | 364/190 |
| 5,694,013 A | 12/1997 | Stewart et al. | 318/561 |
| 5,696,535 A | 12/1997 | Rutledge et al. | 345/161 |
| 5,709,219 A | 1/1998 | Chen et al. | 128/782 |
| 5,714,978 A | 2/1998 | Yamanaka et al. | 345/157 |
| 5,721,566 A | 2/1998 | Rosenberg et al. | 345/161 |
| 5,734,373 A | 3/1998 | Rosenberg et al. | 345/161 |
| 5,736,978 A | 4/1998 | Hasser et al. | 345/173 |
| 5,739,811 A * | 4/1998 | Rosenberg et al. | 345/161 |
| 5,742,278 A | 4/1998 | Chen et al. | 345/156 |
| 5,755,577 A | 5/1998 | Gillio | 434/262 |
| 5,767,839 A | 6/1998 | Rosenberg | 345/161 |
| 5,781,172 A | 7/1998 | Engel et al. | 345/164 |
| 5,784,052 A | 7/1998 | Keyson | 345/167 |
| 5,790,108 A | 8/1998 | Salcudean et al. | 345/184 |
| 5,802,353 A | 9/1998 | Avila et al. | 395/500 |
| 5,816,823 A | 10/1998 | Naimark et al. | 434/307 |
| 5,825,308 A | 10/1998 | Rosenberg | 341/20 |
| 5,857,986 A | 1/1999 | Moriyasu | 601/49 |
| 5,889,670 A | 3/1999 | Schuler et al. | 364/186 |
| 5,897,437 A | 4/1999 | Nishiumi et al. | 463/47 |
| 5,914,705 A | 6/1999 | Johnson et al. | 345/163 |
| 5,944,151 A | 8/1999 | Jakobs et al. | 188/267.1 |
| 5,956,016 A | 9/1999 | Kuezner et al. | 345/156 |
| 5,956,484 A | 9/1999 | Rosenberg et al. | 395/200.33 |
| 5,959,613 A * | 9/1999 | Rosenberg et al. | 345/161 |
| 5,973,670 A | 10/1999 | Barber et al. | 345/157 |
| 5,973,689 A | 10/1999 | Gallery | 345/339 |
| 5,984,880 A | 11/1999 | Lander et al. | 600/595 |
| 5,990,869 A | 11/1999 | Kubica et al. | 345/163 |
| 5,999,168 A * | 12/1999 | Rosenberg et al. | 345/161 |
| 6,001,014 A | 12/1999 | Ogata et al. | 463/37 |
| 6,004,134 A | 12/1999 | Marcus et al. | 434/45 |
| 6,005,551 A | 12/1999 | Osborne et al. | 345/161 |
| 6,020,876 A | 2/2000 | Rosenberg et al. | 345/157 |
| 6,028,593 A | 2/2000 | Rosenberg et al. | 345/156 |
| 6,046,726 A | 4/2000 | Keyson | 345/156 |
| 6,057,828 A | 5/2000 | Rosenberg et al. | 345/156 |
| 6,078,308 A | 6/2000 | Rosenberg et al. | 345/145 |
| 6,088,017 A | 7/2000 | Tremblay et al. | 345/156 |
| 6,128,006 A | 10/2000 | Rosenberg et al. | 345/163 |
| 6,131,097 A | 10/2000 | Peurach et al. | 707/102 |
| 6,161,126 A | 12/2000 | Wies et al. | 709/203 |
| 6,166,723 A | 12/2000 | Schena et al. | 345/184 |
| 6,184,868 B1 | 2/2001 | Shahoian et al. | 345/161 |
| 6,211,861 B1 | 4/2001 | Rosenberg et al. | 345/163 |
| 6,219,032 B1 | 4/2001 | Rosenberg et al. | 345/157 |
| 6,252,579 B1 | 6/2001 | Rosenberg et al. | 345/145 |
| 6,252,583 B1 | 6/2001 | Braun et al. | 345/156 |
| 6,300,936 B1 | 10/2001 | Braun et al. | 345/156 |
| 6,300,937 B1 | 10/2001 | Rosenberg | 345/156 |

FOREIGN PATENT DOCUMENTS

| | | |
|---|---|---|
| JP | H4-92691 | 3/1992 |
| JP | H5-86387 | 11/1993 |
| JP | H6-210065 | 8/1994 |
| JP | S62-194389 | 12/1997 |
| WO | WO92/00559 | 1/1992 |
| WO | WO9520788 | 8/1995 |
| WO | WO9731333 | 8/1997 |
| WO | WO00/03319 | 1/2000 |

OTHER PUBLICATIONS

Ouh–young, M. et al., "Creating an Illusion of Feel: Control Issues in Force Display," Computer Science Dept., Univ. of North Carolina, 1989, pp. 1–14.

Yokokohji, Y., "What You Can See is What You Can Feel — Development of a Visual/Haptic Interface to Virtual Environment," Proc. of VRAIS '96, IEEE 0–8186–7295–1, 1996, pp. 46–54.

Iwata, H., "Artificial Reality with Force Feedback: Development of Desktop Virtual Space with Compact Master Manipulator," Computer Graphics, vol. 24, No. 4, 1990, pp. 165–170.

Rosenberg et al., "The use of force feedback to enhance graphical user interfaces," Stereoscopic Displays and Virtual Reality Systems III, Proc. SPIE 2653, 1996, pp. 243–248.

Howe, "Task Performance with a Dextrous Teleoperated Hand System", Harvard University, Division of Applied Sciences, Cambridge, MA 02138, Telemanipulator Technology 32, Proceedings of SPIE, vol. 1833, 1992.

Gotow, et al., "Perception of Mechanical Properties at the Man–Machine Interface", Department of Mechanical Enginnering and The Robotics Institute, Carnegie Mellon University, Pittsburgh, PA 15213.

Buttolo, et al., "Pen–Based Force Display for Precision Manipulation in Virtual Enviornments", Proceedings IEEE Virtual Reality Annual International Symposium, pp. 217–224, March, 1995.

Colgate, J. Edward et al., "Implementation of Stiff Virtual Walls in Force–Reflecting Interfaces," 1993, pp. 1–9.

Yamakita, M. et al., "Tele–Virtual Reality of Dynamic Mechanical Model, IEEE July 7–10, 1992, pp.1103–1110.

Rosenberg, L.B., "Commercially Viable Force Feedback Controller for Individuals with Neuromotor Disabilities", AL/CF–TR–1997–0016, United States Air Force Armstrong Laboratory, May 1996.

Rosenberg, Louis B., "The Use of Virtual Fixtures to Enhance Operator Performance in Time Delayed Teleoperation, Armstrong Laboratory, March 1993, pp. 1–45.

Rosenberg, Louis B., "Perceptual Design of a Virtual Rigid Surface Contact," Center for Design Research Stanford University, Air Force Material Command, Apr. 1993, pp. 1–41.

Adachi, Yoshitaka et al., "Sensory Evaluation of Virtual Haptic Push–Buttons," Technical Research Center, Suzuki Motor Corporation, Nov. 1994.

Winey III, "Computer Simulated Visual and Tactile Feedback as an Aid to Manipulator and Vehicle control", Massachuetts Inst. of Technology, 1981.

Adelstein, et al., "Design and Implementation of a Force Reflecting Manipulandum for Manual Control Research", Steling Software Aerospace Human Factors Research Division, NASA–Ames, Moffett Field, CA, 1992.

Tan, Hong Z et al., "Manual Resolution of Compliance When Work and Force Cues are Minimized," ASME 1993, DSC–vol. 49, pp. 99–104.

Rosenberg, Louis et al., "Perceptual Decomposition of Virtual Haptic Surfaces," IEEE Symposium on Research Frontiers in Virtual Reality, Oct. 1993.

Rosenberg, L., "Virtual Fixtures as Tools to Enhance Operator Performance in Telepresence Environments," SPIE Telemanipulator Technology, 1993.

Rosenberg, L., "Virtual Haptic Overlays Enhance Performance in Telepresence Tasks," Dept. of Mechanical Engineering, Stanford Univ., 1994.

Repperger, D.W., "Active Force Reflection Devices in Teleoperation", IEEE Control Systems, 1991, pp. 52–56.

Tan, H. et al., "Human Factors for the Design of Force–Reflecting Haptic Interfaces", ASME WAM '94, 1994, pp. 1–11.

Hannaford et al., "Performance Evaluation of a Six–Axis Generalized Force–Reflecting Teleoperator", IEEE Transactions on Systems, Man, and Cybernetics, vol. 21, 3, May/Jun. 1991.

Ellis, et al., "Design and Evaluation of a High–Performance Prototype Planar Haptic Interface", DSC–vol. 49, Advances in Robotics, Mechatronics,nd Haptic Interfaces ASME 1993, pp. 55–64.

Hiroo Iwata, "Pen–based Haptic Virtual Environment", Institute of Engineering Mechanics, University of Tsukuba, IEEE, 1993, pp. 287–292.

Schmult et al., "Application Areas for a Force–Feedback Joystick", Department of Machine Perception Research AT&T Bell Laboratories, Holmdel, New Jersey, DSC–vol. 49, Interfaces ASME 1993, pp. 47–54.

Batter, et al., "Grope–1: A Computer Display to the Sense of Feel", University of North Carolina at Chapel Hill, Chapel Hill, North Carolina, USA, Proc. IFIP Congress 1971, pp. 759–763.

Minsky, et al., "Feeling and Seeing: Issues in Force Display", Department of Computer Science, University of North Carolina at Chapel Hill, Chapel Hill, NC 27599, 1990 ACM, pp. 235–238.

Russo, "The Design and Implementation of a Three Degree–of–Frredom Force Output Joystick", Submitted to the Department of Mechanical Engineering on May 11, 1990, pp. 1–40.

Ming Ouh–Young, "Force Display in Molecular Docking", University of North Carolina at Chapel Hill, 1990, pp. 1–12, 66–85.

Fischer, et al., "Specification and Design of Input Devices for Teleoperation", Robotics Research Group, IEEE, 1990, pp. 540–545.

Kilpatrick, Paul Jerome, 1947, "The Use of a Kinesthetic Supplement in an Interactive Graphics System", Xerox University Microfilms, Ann Arbor, Michigan 48106, 1976, pp. 1–175.

Ouh–Young, Ming, "Using a Manipulator for Force Display in Molecular Docking", IEEE, 1988, pp. 1824–1829.

Payette, J. et al., "Evaluation of a Force Feedback (Haptic) Computer Pointing Device in Zero Gravity," DSC–vol. 58, Proc. of ASME Dynamics Systems an Control Division, 1996, pp. 547–553.

Millman, P. et al., "Design of a Four Degree–of–freedom Force–reflecting Manipuladum with a Specified Force/Torque Workspace," IEEE 4/91/0000/1488, 1991, pp. 1488–1493.

Hirota, K. et al., "Development of Surface Display," IEEE 0–7803–1363–1/93, 1993, pp. 256–262.

Brooks, Jr., F. et al., "Project GROPE–Haptic Displays for Scientific Visualization," Computer Graphics, vol. 24, No. 1, 1990, pp. 177–185.

Ramstein, C. et al., "Combining Haptic and Braille Technologies," ACM 0–89791–776–6, 1996, pp. 37–44.

Rosenberg, L., "A Force Feedback Programming Primer," Immersion Corp., 1997, pp. 1–177.

Atkinson, W. et al., "Computer with Feeling," Comput. & Graphics, vol. 2, Pergamon Press, 1977, pp. 97–103.

Akamatsu, M. et al., "Multimodal Mouse: A Mouse–Type Device with Tactile and Force Display," Presence, vol. 3,No. 1, 1994, pp. 73–80.

* cited by examiner

HYBRID CONTROL OF HAPTIC FEEDBACK FOR HOST COMPUTER AND INTERFACE DEVICE

CROSS REFERENCE TO RELATED APPLICATIONS

This application is a continuation-in-part of U.S. patent application Ser. No. 09/322,245 filed May 28, 1999 now U.S. Pat. No. 6,275,439, entitled, "Shaping Force Signals Output by a Force Feedback Device," which is a continuation of U.S. patent application Ser. No. 08/747,841, now U.S. Pat. No. 5,959,613, filed Nov. 13, 1996;

and this application claims the benefit of U.S. Provisional Applications No. 60/160,401, filed Oct. 19, 1999, entitled, "Hybrid Control of Force Feedback for a Host Computer and Interface Device," and Ser. No. 60/221,496, filed Jul. 27, 2000, entitled, "Hybrid Control of Vibrations in Haptic Feedback Devices,"

all of which are incorporated herein by reference in their entirety.

Certain inventions provided herein were made with government support under Contract Number M67004-97-C-0026, awarded by the Department of Defense. The government has certain rights in these inventions.

BACKGROUND OF THE INVENTION

The present invention relates generally to interface devices for allowing humans to interface with computer systems, and more particularly to low-cost computer interface devices that allow computer systems to provide haptic feedback to the user.

Haptic feedback interface devices are currently available to interface a person with a host computer device such as a personal computer, game console, portable computer, or other type of computer. Several different types of consumer level haptic feedback devices are available, including joysticks, mice, steering wheels, gamepads, etc. The computer displays a graphical environment such as a game, graphical user interface, or other program and the user controls a graphical object or other aspect of the graphical environment by inputting data using the interface device, typically by moving a manipulandum or "user manipulatable object" such as a joystick handle or steering wheel. The computer also may output haptic feedback information to the interface device which controls the device to output haptic feedback to the user using motors or other actuators on the device. The haptic feedback is in the form of vibrations, spring forces, textures, or other sensations conveyed to the user who is physically grasping or otherwise contacting the device. The haptic feedback is correlated to events and interactions in the graphical environment to convey a more immersive, entertaining, and functional environment to the user. In some interface devices, kinesthetic feedback is provided, while others may provide tactile feedback; these are collectively and generally referenced herein as "haptic feedback."

In most commercially available haptic feedback interface devices, the goal has been to reduce the processing loading on the host computer by offloading as much of the processing as possible to the device itself. Thus, while haptic feedback devices may have significant differences, most of the more sophisticated devices share a common feature: a local microcontroller on the device that is able to compute and output forces as directed by high-level commands from the host computer. These dual-architecture systems produce very high quality haptic feedback output while presenting a minimal processing load on the host system.

However, in order to achieve these capabilities on the device, there is a price to pay. The force computations that are required to generate the output can be computationally expensive operations. As a result, the microcontroller that is embedded in the interface device needs to be sufficiently powerful in order to handle this processing. The end result is that the device microcontroller is expensive and the completed interface products have a significant cost to consumers. While this extra cost is bearable when the market for these devices is new, the cost of these consumer devices is constantly being driven to lower levels as the market continues to mature.

In order to reduce the processing power (and thereby the cost) of the device microcontroller and maintain the product quality level, other alternate solutions should be explored.

SUMMARY OF THE INVENTION

The present invention is directed to a hybrid haptic feedback system in which a host computer and haptic feedback device can share processing loads to various degrees in the output of haptic sensations, and is also directed to features for efficient output of haptic sensations in such a system.

More particularly, a haptic feedback interface device in communication with a host computer includes a user manipulatable object physically contacted and moveable by a user, an actuator outputting forces felt by the user, a sensor detecting motion of the user manipulatable object, and a device microcontroller outputting force values to the actuator to control the forces and receiving sensor signals. The microcontroller determines a closed loop force value based at least in part on a sensor signal and outputs the closed loop force value to the actuator. The microcontroller does not compute open loop force values but instead receives open loop force values from the host computer and directs the these force values to the actuator. Preferably, the open loop force values are primarily based on time, such as periodic forces, and are computed on the host computer. The closed loop forces, such as springs and damping forces, are based on user object position or motion and are computed on the local microcontroller. The open loop force values can be received from the host over a streaming serial communication channel.

Other features allow the microcontroller to extrapolate a force value or output a previously received force value if a force value received from the host is corrupted or missing; or to terminate an output force if a time from receiving host force values reaches a predetermined length. An emulator layer on the host which computes force values can emulate a haptic feedback device so that a host application program or other host layer sends a command as if it were sending the command to the haptic feedback device. A streaming channel of force values can be kept continuously full of streaming data by providing a transfer request to a communication driver on the host while the communication driver is outputting data from a previous transfer request to the device. Force values can be stored by the host and retrieved to be output as repeating force values.

In another aspect of the present invention, a method for providing haptic feedback functionality on a host computer in a hybrid system includes receiving on a driver of the host computer a command provided by an application program to provide a force effect having a type. Based on the type of force effect, information derived from the command is either directed to the haptic feedback device so the device computes a force value from the information, or information derived from the command is stored in memory of the host and a force value is computed using the driver, where the driver provides the computed force value to the haptic feedback device. The force value is output as a force by the haptic feedback device to a user of the haptic feedback device. In one embodiment, the type is either open loop or closed loop, where the force value from the closed loop effect is computed by the haptic feedback device and the force value from the open loop effect is computed by the driver. The driver can emulate a haptic feedback device so that the application program is ignorant of any division in computation of forces. The driver can select a particular period of sending information to the device based on a processing burden on the host computer or device or communication bandwidth.

In another aspect of the present invention, a force feedback interface device includes a user manipulatable object, an actuator outputting forces felt by the user, a sensor detecting motion of the user manipulatable object, and a device microcontroller determining a force value of a high frequency open loop effect based at least in part on a command received from the host computer. The microcontroller does not determine force values for low frequency open loop effects and instead receives the low frequency open loop force values from the host. The microcontroller directs all open loop force values to the actuator. The low frequency open loop force values preferably describe an effect having a frequency under a threshold frequency, and high frequency open loop values are for an effect having a frequency over the threshold frequency. The open loop force values can define vibration force effects. Similar or other embodiments allow the microcontroller to determine closed loop force values based at least in part on sensor signals describing a position or motion of the user manipulatable object, where the microcontroller does not determine low frequency open loop force values and receives low frequency open loop force values from the host computer to be output by the actuator.

The present invention advantageously provides a hybrid haptic feedback system that allows the processing burden to be shared between device and host to different degrees depending on the needs of the system designer or producer. The greater the processing burden the host takes on, the less expensive the device can be made; various features of the present invention allow the host to take on a greater processing burden than allowed by existing dual-architecture haptic feedback systems yet maintain quality haptic feedback.

These and other advantages of the present invention will become apparent to those skilled in the art upon a reading of the following specification of the invention and a study of the several figures of the drawing.

DETAILED DESCRIPTION OF PREFERRED EMBODIMENTS

In many preferred embodiments, the present invention reduces the complexity of the device microcontroller and maintains the quality of haptic feedback by sharing the force processing loading between the device microcontroller and the processor of the host computer. This sharing of processing results in a "hybrid" haptic feedback system that functions much like existing haptic systems but allows a more limited, inexpensive processor to be used in the interface device and allows the host computer to handle at least a portion of the computations yet maintain the overall quality of the haptic feedback system. Several inventive embodiments and aspects of a hybrid system are described herein.

Figure 1:
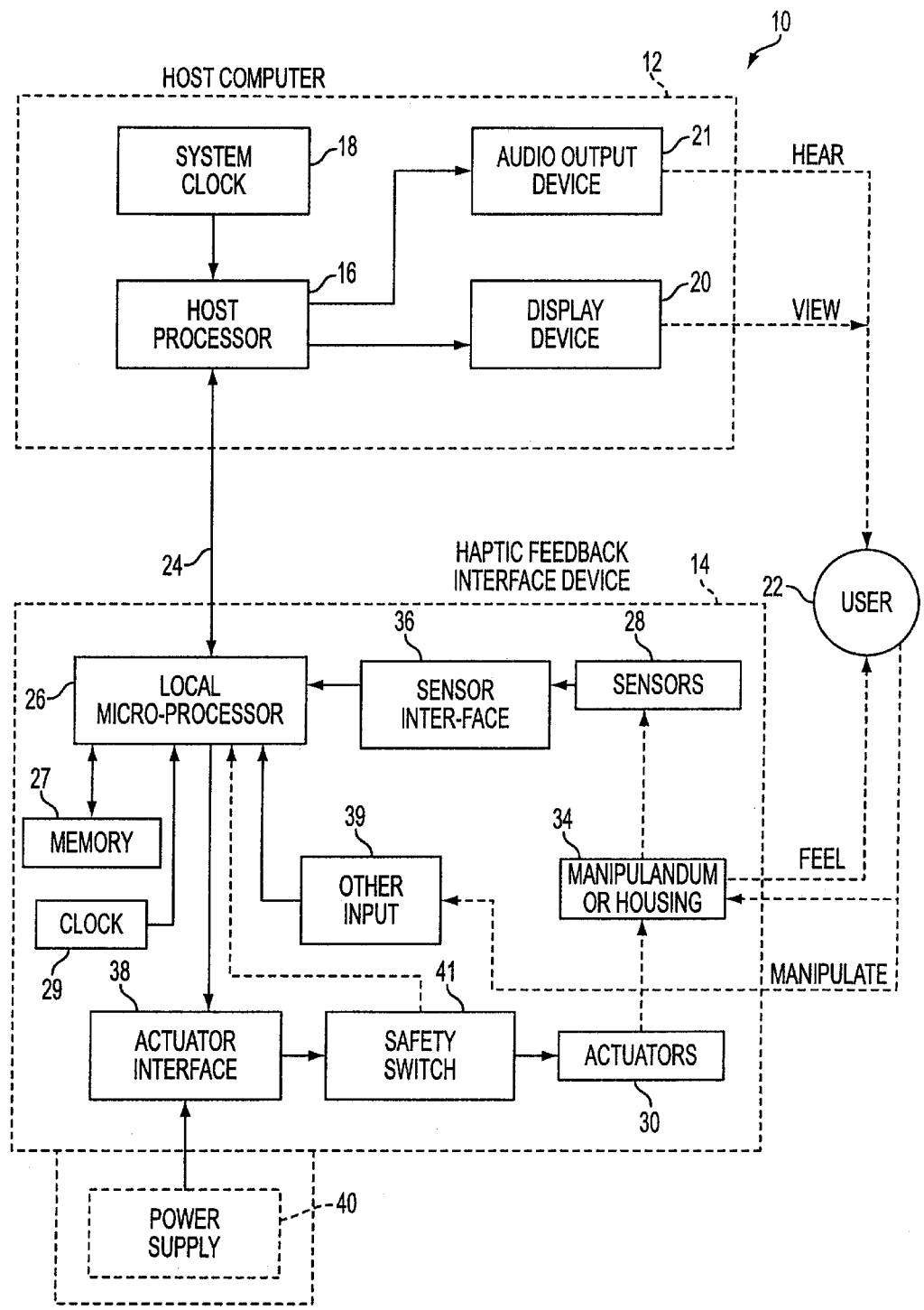
FIG. 1 is a block diagram illustrating a haptic feedback system suitable for use with the present invention.

FIG. 1 is a block diagram illustrating a haptic feedback interface system 10 suitable for use with the present invention controlled by a host computer system. Interface system 10 includes a host computer system 12 and an interface device ("device") 14.

Host computer system 12 can be any of a variety of computing devices. Host 12 can be a personal computer, such as a PC or Macintosh personal computer, or a workstation, such as a SUN or Silicon Graphics workstation. Alternatively, host computer system 12 can be one of a variety of home video game systems, such as systems available from Nintendo, Sega, or Sony, a television "set top box" or a "network computer", a portable computer, game device, personal digital assistant, arcade game machine, main microprocessor in a vehicle or other system, etc. Host computer system 12 preferably implements one or more host application programs with which a user 22 is interacting via peripherals and haptic feedback interface device 14. For example, the host application program can be a video game, medical simulation, scientific analysis program, operating system, graphical user interface, or other application program that utilizes haptic feedback. Typically, the host application provides images to be displayed on a display output device, as described below, and/or other feedback, such as auditory signals.

Host computer system 12 preferably includes a host microprocessor 16, random access memory (RAM) 17, read-only memory (ROM) 19, input/output (I/O) electronics 21, a clock 18, a display screen 20, and an audio output device 21. Display screen 20 can be used to display images generated by host computer system 12 or other computer systems, and can be a standard display screen, CRT, flat-panel display, 3-D goggles, visual projection device, or any other visual output device. Audio output device 21, such as speakers, is preferably coupled to host microprocessor 16 via amplifiers, filters, and other circuitry well known to those skilled in the art (e.g. in a sound card) and provides sound output to user 22 from the host computer 12. Other types of peripherals can also be coupled to host processor 16, such as storage devices (hard disk drive, CD ROM/DVD-ROM drive, floppy disk drive, etc.), printers, and other input and output devices. Data for implementing the interfaces of the present invention can be stored on computer readable media such as memory (e.g., RAM or ROM), a hard disk, a CD-ROM or DVD-ROM, etc.

An interface device 14 is coupled to host computer system 12 by a bi-directional bus 24. The bi-directional bus sends signals in either direction between host computer system 12 and the interface device, and can be a serial bus, parallel bus, Universal Serial Bus (USB), Firewire (IEEE 1394) bus, wireless communication interface, etc. An interface port of host computer system 12, such as an RS232 or Universal Serial Bus (USB) serial interface port, parallel port, game port, etc., connects bus 24 to host computer system 12.

Interface device 14 includes a local microprocessor 26, sensors 28, actuators 30, a user object 34, optional sensor interface 36, an optional actuator interface 38, and other optional input devices 39. Local microprocessor 26 is coupled to bus 24 and is considered local to interface device 14 and is dedicated to haptic feedback and sensor I/O of interface device 14. Microprocessor 26 can be provided with software instructions to wait for commands or requests from computer host 16, decode the commands or requests, and handle/control input and output signals according to the commands or requests. In addition, processor 26 preferably operates independently of host computer 16 by reading sensor signals and calculating appropriate forces from those sensor signals, time signals, and stored or relayed instructions selected in accordance with a host command. Suitable microprocessors for use as local microprocessor 26 include the I-Force Processor from Immersion Corp., the MC68HC711E9 by Motorola, the PIC16C74 by Microchip, and the 82930AX by Intel Corp., for example, or more lower-end microprocessors in some embodiments (e.g. if the host is sharing significant force processing according the present invention). Microprocessor 26 can include one microprocessor chip, or multiple processors and/or co-processor chips, and/or digital signal processor (DSP) capability. In some embodiments, the microprocessor 26 can be more simple logic circuitry, state machines, or the like.

Microprocessor 26 can receive signals from sensors 28 and provide signals to actuators 30 of the interface device 14 in accordance with instructions provided by host computer 12 over bus 24. For example, in a preferred local control embodiment, host computer system 12 provides high level supervisory commands to microprocessor 26 over bus 24, and microprocessor 26 manages low level force control loops to sensors and actuators in accordance with the high level commands and independently of the host computer 18. The haptic feedback system thus provides a host control loop of information and a local control loop of information in a distributed control system. This operation is described in greater detail in U.S. Pat. No. 5,739,811 and patent application Ser. Nos. 08/877,114 and 08/050,665 (which is a continuation of U.S. Pat. No. 5,734,373), all incorporated by reference herein in their entirety. The microprocessor 26 is preferably operative to implement local closed loop effects dependent on position (and/or velocity, acceleration) of the user manipulatable object, as well as operative to receive commands for open loop effects which are calculated and directly output when conditions are appropriate, although the host can share in this processing according to the present invention, as described in detail below. Microprocessor 26 can also receive commands from any other input devices 39 included on interface apparatus 14, such as buttons, and provides appropriate signals to host computer 12 to indicate that the input information has been received and any information included in the input information. Local memory 27, such as RAM and/or ROM, is preferably coupled to microprocessor 26 in interface device 14 to store instructions for microprocessor 26 and store temporary and other data. In addition, a local clock 29 can be coupled to the microprocessor 26 to provide timing data.

Sensors 28 sense the position, motion, and/or other characteristics of a user manipulatable object 34 of the interface device 14 along one or more degrees of freedom and provide signals to microprocessor 26 including information representative of those characteristics. Rotary or linear optical encoders, potentiometers, optical sensors, velocity sensors, acceleration sensors, strain gauge, or other types of sensors can be used. Sensors 28 provide an electrical signal to an optional sensor interface 36, which can be used to convert sensor signals to signals that can be interpreted by the microprocessor 26 and/or host computer system 12.

Actuators 30 can transmit forces to user object 34 of the interface device 14 in one or more directions along one or more degrees of freedom in response to "force values" received from microprocessor 26. A force value can indicate a magnitude of force to be output by the actuator, and may also in some embodiments indicate direction of force output in the degree of freedom of force output of the actuator. In some embodiments, the actuators 30 transmit forces to the housing of the device 14 (instead of or addition to object 34) which are felt by the user. Actuators 30 can include two types: active actuators and passive actuators. Active actuators include linear current control motors, stepper motors, pneumatic/hydraulic active actuators, a torquer (motor with limited angular range), voice coil actuators, and other types of actuators that transmit a force to move an object. Passive actuators can also be used for actuators 30, such as magnetic particle brakes, friction brakes, or pneumatic/hydraulic passive actuators. Actuator interface 38 can be optionally connected between actuators 30 and microprocessor 26 to convert signals from microprocessor 26 into signals appropriate to drive actuators 30. Optionally, some or all of the functionality of the sensor interface 36 and/or actuator interface 38 can be incorporated into the microprocessor 26, such as pulse width modulation (PWM) controllers for actuators, encoder processing circuitry, etc. Force values can be implemented as analog signals, PWM signals, or other signals that are input to the actuator.

Other input devices 39 can optionally be included in interface device 14 and send input signals to microprocessor 26 or to host processor 16. Such input devices can include buttons, dials, switches, levers, or other mechanisms. For example, in embodiments where user object 34 is a joystick, other input devices can. include one or more buttons provided, for example, on the joystick handle or base. Power supply 40 can optionally be coupled to actuator interface 38 and/or actuators 30 to provide electrical power. A safety switch 41 is optionally included in interface device 14 to provide a mechanism to deactivate actuators 30 for safety reasons.

User manipulable object 34 ("user object" or "manipulandum") is a physical object, device or article that may be grasped or otherwise contacted or controlled by a user and which is coupled to interface device 14. By "grasp", it is meant that users may releasably engage a grip portion of the object in some fashion, such as by hand, with their fingertips, or even orally in the case of handicapped persons. The user 22 can manipulate and move the object along provided degrees of freedom to interface with the host application program the user is viewing on display screen 20. Object 34 can be a joystick, mouse, trackball, stylus, steering wheel, sphere, medical instrument (laparoscope, catheter, etc.), pool cue (e.g. moving the cue through actuated rollers), hand grip, rotary or linear knob, button, gamepad, gamepad control, gun-shaped targeting device, or other article. Many types of mechanisms and linkages can also be employed to provide the degrees of freedom to the user manipulatable object, as well as amplification transmissions such as gears, capstan drives, and belt drives, to amplify movement for increased sensor resolution and amplify forces for output. In some embodiments, the user object and/or the device itself can be a handheld device, e.g., a gamepad controller for video games or computer games, a portable computing device, or a hand-held remote control device used to select functions of a television, video cassette recorder, sound stereo, internet or network computer (e.g., Web-TV™).

Hybrid Architecture

The "hybrid" architecture of the present invention allows sharing of the force processing between the haptic feedback interface device and the host computer. In a hybrid architecture, the host computer computes at least some of the force values that are sent to the actuators of the device, thus reducing the processing requirements of the local microprocessor 26 on the device. A "force value" is a value that indicates a magnitude and (in some cases) a direction of a force and which can be directly translated into that force by the actuator and/or by an actuator interface, such as a PWM circuit. For example, a force value can be provided for each axis or degree of freedom for a device (including direction on that axis), or a force value can include a magnitude portion and a direction portion for a force in a multi-dimensional space. In preferred hybrid embodiments, force values sent from the host system to the device can be summed with any force values computed on the device. In some embodiments, the device can then perform postprocessing on the total force value to implement such features as kinematics, linearization, and safety ramping, if such features are present, and the processed force value is sent to an actuator as an appropriate signal to be output as a force.

Implementing a hybrid device presents several technical challenges that need to be overcome to make this invention feasible. The first significant issue to deal with is the architecture of the hybrid system. One basic goal of the hybrid architecture is to employ some of the host processing power in order to compute force values over time. One solution is to allow the host to precompute the force output values for each time step of a force effect that is to be output and transfer this data to the device before the force effect is to be output, where the device can output the effect when it is required. This approach allows some variance in the time of delivery of the force values to the device as long as the host sends values before they are needed to be output. However, since high quality force output requires updating the output on the order of hundreds of times a second, this would require the device to have sufficiently large memory to store the force samples for a large portion of the effect, such as an entire period. The cost of this additional memory, which would likely be comparable to the savings obtained by scaling the device microcontroller back, makes this option potentially less desirable.

Another solution is to have the host system compute the force outputs in "real time" and send this data to the device at a fixed periodic rate. This method would not require the extra device memory, as the data is delivered to the device from the host as it is required and is directly output by the device. However, the host system would be required to compute the output at relatively high output rates.

Another issue that exists, regardless of the system architecture, is the processing loading that would be added to the host system. Because the computation of the force output values is a relatively complex process, moving this computation loading to the host system could have a significant impact on the host system performance. This may be especially true in processor-intensive host applications such as a gaming environment, where the host processor is already significantly loaded performing the computations to handle the graphics and audio output.

Despite these issues, there are two industry trends that will make the shared processing architecture become more feasible over time. First, the processing power of computer systems is growing rapidly. If it is assumed that the computations required to handle haptic feedback output remain relatively consistent, then the percentage of the processing power required from the host system will only decrease over time. This will continue to reduce the impact of any force processing on the host system.

The second trend that aids the shared processing architecture is the introduction of newer peripheral communication busses that are designed to support the concept of an isochronous or streaming data channel. If the host system were to attempt to generate a fixed period output stream using traditional peripheral busses, it would greatly complicate the host software. This is especially true for a desktop operating system, such as Microsoft Windows™, as it is not a goal of these systems to allow true real time operation. Busses that have built in support for isochronous data transfers greatly aid the host system and significantly reduce the processing burden required to ensure the data transfers occur at a fixed frequency. Examples of peripheral busses that provide support for isochronous data transfers include Firewire (IEEE 1394) and the Universal Serial Bus (USB).

Embodiments

The following description details investigative work concerning the issues and implementations of a consumer haptic feedback device that uses a shared processing, or hybrid, architecture. A basic architecture of host computer and device processor, such as shown in FIG. 1, are also described in greater detail in U.S. Pat. No. 5,734,373 and in U.S. Pat. No. 5,959,613 (and copending application Ser. No. 09/322,245), which are all incorporated herein by reference in their entirety.

Basic Architecture

A fundamental goal of this invention is to increase the capabilities of a simple, low-cost haptic feedback device connected to a host computer by using some of the host system's processing to emulate a device with increased processing power. An "emulation layer" ("emulator"), e.g. a software functionality layer, can be implemented on the host to handle this emulation of a highly capable device. Many different implementations of the emulator can be provided. However, in some systems (such as Microsoft® Windows™), significant advantages are gained if a very low level driver on the host implements the emulation layer on the host system, e.g. a driver situated below most other programs running on the host computer in the hierarchy of programs running. There are several reasons for this.

One reason is that, since the host operating system cannot determine whether the capabilities being enumerated are being emulated or not, it will treat a fully capable device and an emulated device identically. This means that any software that can use the fully capable device will be able to use the emulated device without any changes. Another reasons is that, by performing the emulation processing at a very low level in the system, there is reduced overhead to perform the transfers from the host to device. Since these transfers are occurring very frequently, this processing reduction will result in an increase in system performance.

Figure 2:
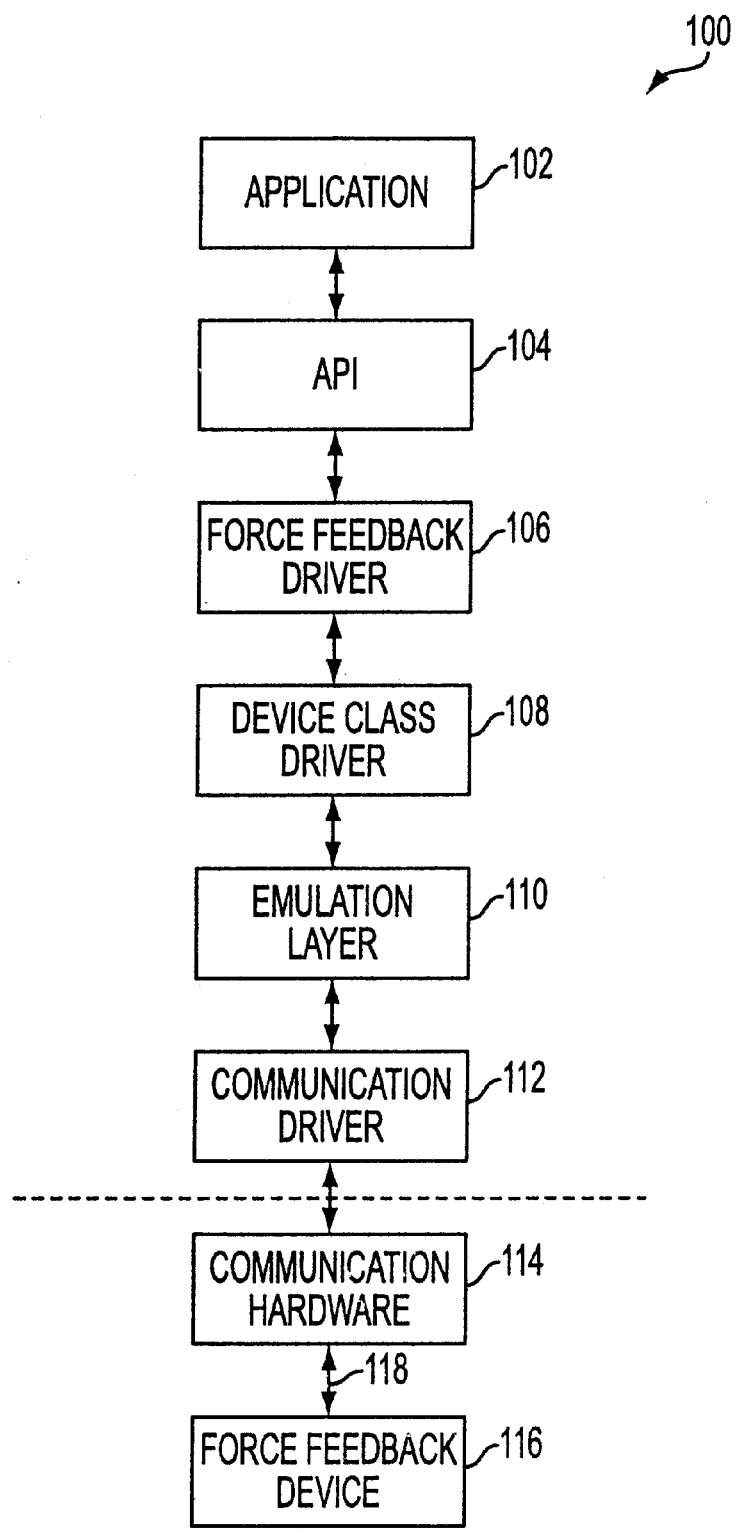
FIG. 2 is a block diagram illustrating a hierarchy of software layers that can operate on the host computer system.

FIG. 2 shows a hierarchy 100 of implementation levels implemented in host software at a general level. An application program 102 is running at the top level, and other application programs may also be running in a multi-tasking environment. An application program interface (API) 104 communicates with the application 102 to implement function calls and other tasks. For example, in the Windows operating system, the DirectInput API can be used with haptic feedback interface devices. Below the API 104, a haptic feedback driver 106 is running, which typically is specific to a particular device or a class of devices. The haptic feedback driver 106 can implement particular calls and commands to a haptic feedback device based on API and/or application commands and interface with the device at a lower level. The device class driver 108 can be situated below the haptic feedback driver, and is used to determine a class of input device based on information provided from the device. For example, in a Windows™ system, the Hid.dll and the HidClass.sys files can perform this function. Below the device class driver 108 is a preferred layer position for the emulation layer 110 of the present invention. Below the emulation layer 110 is the communication driver 112 which uses the communication hardware 114 to communicate directly with the haptic feedback device 116 over a bus 118. For example, in a Windows USB system, the USBD interface can be used as the communication driver to communicate with the device using communication hardware such as the OHCI or UHCI host controllers, as is well known in the art.

Even though the emulation may function better if it is lower in the system driver stack, it is possible to handle the emulation at a different, e.g. higher, level and still function. For example, the application program 102 itself, or a driver just below the application program, could handle the host effects. Herein, the term "driver" is intended to mean any program running on the host computer below the application program level that can implement the force-related functions and features described herein.

The methods and embodiments described below, such as the emulator functionality, may be implemented with program instructions or code stored on or transferred through a computer readable medium. Such a computer readable medium may be digital memory chips or other memory devices; magnetic media such as hard disk, floppy disk, or tape; or other media such as CD-ROM, DVD, PCMCIA cards, etc. The program instructions may also be transmitted through a channel (network, wireless transmission, etc.) to the host computer or device (where appropriate) from a different source. Some or all of the program instructions may also be implemented in hardware, e.g. using logic gates.

Streaming Processing

In order for the host system to effectively perform emulation for the device, it will need to execute computational processing to generate the force output in a timely manner. Since many other processes are operating on the host system in addition to this force processing, generating this timely execution presents several issues.

Determining the frequency of execution for the emulation processing is a bit of a tradeoff. It needs to be fast enough that the device appears to be responsive to the requests of the host software. However, each execution of the emulation processing will generally have some overhead processing time involved. This can take many forms on the host system including an interrupt context switch or a thread context switch. In determining the final frequency of execution, these two factors must be balanced against one another in a compromise.

There are several ways to implement the timing of the execution of the emulation processing. In one embodiment, a timer on the system (derived from the host system clock or some other source) can be used to trigger the processing. In another embodiment, the haptic feedback device can generate messages at a specific time interval which are sent to the host system to trigger the emulation and to trigger the emulator to send force values to the device.

However, when communications interfaces that have built in support for fixed period streaming channels are used, it is far more efficient to control the timing of the emulation based on the communication channel. The emulator 110 preferably works to try to keep the streaming channel filled with data to be sent to the device. In some operating system implementations (e.g., Windows), it is also a requirement that streaming channels are continuously filled with data after they are initiated. As each streaming request is completed, the emulator is triggered to generate new data to be sent to the device.

Figure 3:
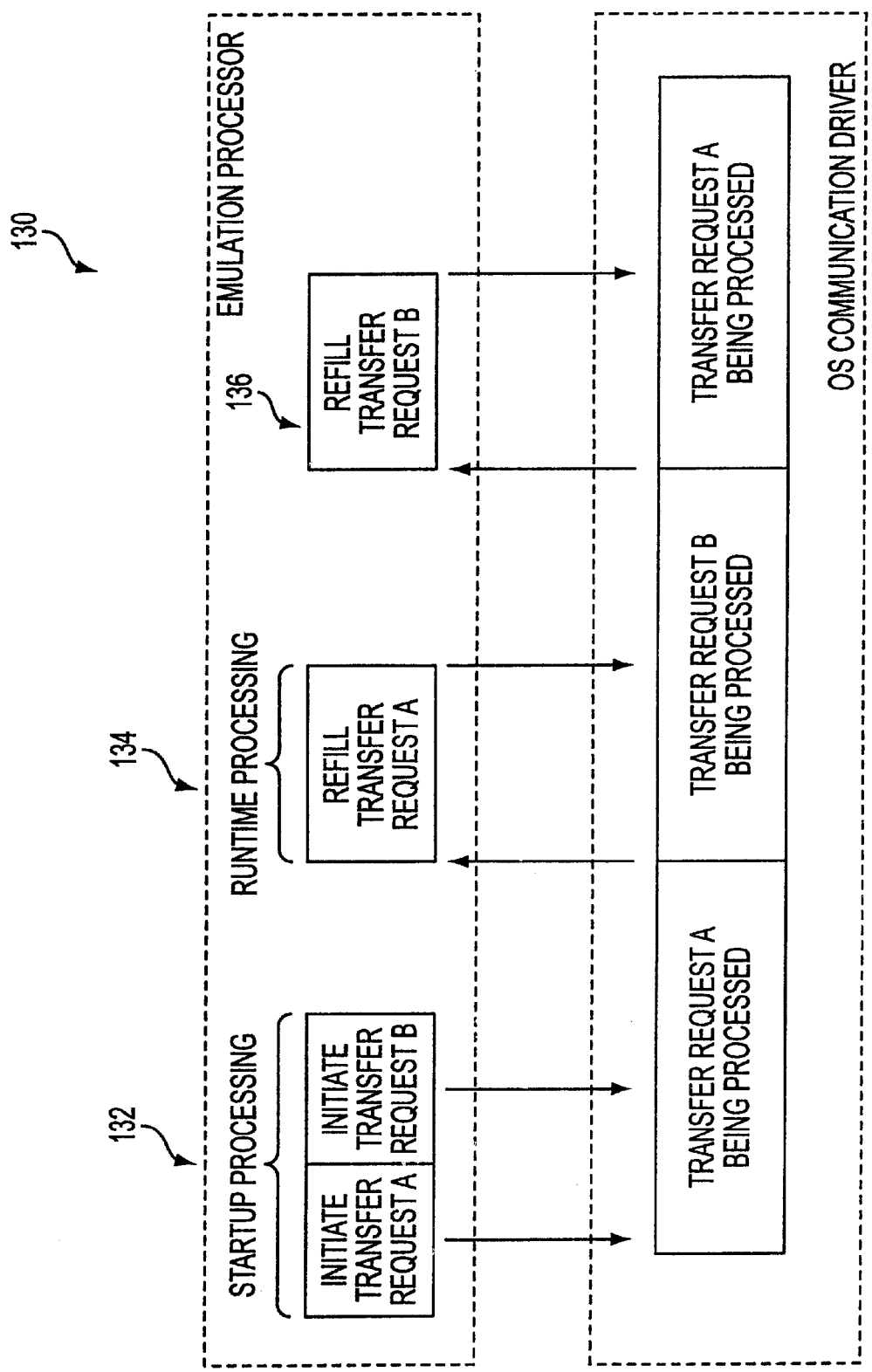
FIG. 3 is a block diagram illustrating communication in one embodiment between the emulator and the operating system communication driver of the host system.

FIG. 3 is a block diagram 130 illustrating communication between the emulator and the operating system (OS) communication driver of the host system in one embodiment. If the operating system or device driver for the host controller is capable, it may be possible to submit several transfer requests to the lower level driver that are queued to be transmitted to the device sequentially in a streaming fashion. This is important when operating under an operating system, such as Windows, where the emulator layer may be delayed too long in submitting a streaming transfer request due to the emulation layer processing to refill the translation layer. The processing delay can be caused by other processes running on the host system which use host processing time, such as disk drive drivers, audio drivers, communication (e.g. network) drivers, etc. If such other processes are running at an equal or higher priority to the emulation layer, then the refill processing can be delayed. Thus, by having multiple requests pending in the communication driver, the emulation processor will have the time that it takes to completely transmit one transfer request in order to refill the other transfer request for transmission.

As shown in FIG. 3, the emulation process can provide two transfer requests, A and B. In the startup processing at stage 132, Transfer Request A is provided to and begun to be processed immediately by the communication driver (e.g., to output data to the device), while Request B is provided to the communication driver during the processing of Request A. When Request A is complete, the communication driver indicates this completion to the emulator with a trigger, and the emulator begins runtime processing (refilling) of Transfer Request A at stage 134. Meanwhile, after it has sent the trigger to the emulator, the communication driver processes Transfer Request B. During the processing of Request B by the communication driver, the emulator finishes refilling Request A and provides the Request A to the driver. When the communication driver finishes Request B and triggers the emulator, the driver can then process the refilled Request A and the emulator can begin refilling Request B at stage 136. The runtime processes repeat to allow delays to have minimal effect in streaming data to the device.

The implementation of the trigger to cause the emulator to perform subsequent computations (such as refilling a request) can be accomplished in many ways. One way is to include an interrupt response routine that is executed when the transfer to the device is completed. However, in most operating systems, the host controller driver (communication hardware) handles interrupts, not the communication driver, so the interrupts are not exposed high enough to be acted upon and thus the interrupt option is often unavailable. In a different embodiment, a callback routine can be executed when the communication driver has completed the transfer. However, callback routines execute with very high priority. If the callback routine takes an excessive time to complete, some other processes could be starved of processing time. Furthermore, since the callback routine is at an elevated priority, it may not be able to access all the memory it needs (paged out) or use all the system services, e.g. it may be too high a priority to be able to access paged memory which is intended for lower-level priority processes.

A preferred implementation provides an execution thread (on a multi-threaded system) that is awakened from a suspended state by a synchronization object indicating that a pending transfer is completed. This implementation does not have the restrictions of a callback routine, as is well known to those skilled in the art.

Processing Sharing

When an emulation driver is being used for a device, it enables a wide spectrum of "loading sharing" possibilities. These possibilities can range from the emulation driver performing essentially no processing (for a highly capable and sophisticated device) to the emulation driver handling all the force effect computations and sending only a raw force output to the device (for a simple device). As more of the processing is handled in the emulation driver, the processing power of the microprocessor used in the device can be increasingly reduced. For example, if the emulation driver handles substantially all force computation, the microcontroller on the haptic feedback device can be as simple as a state machine or simple logic circuitry. However, for a variety of reasons, the most effective and preferred solution is one that divides the force effect computation/processing between the host system and the device based on the type of the effects being generated. This sharing of the processing presents a few issues that must be dealt with.

Effect Types

As described above, haptic sensations can be commanded in many haptic system embodiments by the host computer with high level commands. The high level commands are formulated by the host computer based on events or interactions occurring in an application program on the host computer, or based on other events or instructions. The high level commands are sent to the haptic feedback device and are parsed or decoded by the local microprocessor on the haptic device. The local microprocessor implements the commands by performing any necessary computations, and outputs an appropriate force effect at an appropriate time, as dictated by parameters or instructions sent with the command and/or any instructions associated with that command as stored in the memory of the haptic feedback device.

When controlling haptic feedback devices, the force commands that are sent to the device are commonly executed as "effects", "force effects", or "haptic effects" which herein is used to indicate any type of force sensation, i.e., each effect is a description of a force sensation to be output by the device, and these terms may describe a single force output on the user or a series, sequence, or combination of many forces over time and/or space. A force sensation is represented by the effect's parameters; some parameters can be common to all effects. These may include parameters such as the effect type, the duration of the effect, and button triggers that can be associated with the effect. Other parameters may be specific to the type of effect. For example, a constant effect needs only a single additional parameter to describe its magnitude. However, a periodic force effect such as a sine wave may require several other parameters for a complete description, such as magnitude, phase, period (frequency), and offset.

When dealing with effects, it is often convenient to group them into two categories. The first group of effects would be those that provide a force primarily based on time. These effects would include such types as constant forces (e.g. pulses or jolts), periodic forces (e.g. vibrations), or sampled force outputs. The important feature that these effects share is that they are all completely independent of the sensed motion measurements on the device. No matter how the device is manipulated by the user, the force output for these effects will be the same. These effects are classified herein as "open loop" effects.

The other group of effects includes effects providing a force that is primarily based on a position (or velocity, acceleration, or "jerk"—derivative of acceleration, which are all based ultimately on position) of a user manipulatable object of the device. These effects include types such as springs, dampers, and spatial textures. The force output from these effects is directly related to the motion that occurs, and which is sensed, on the device. Because the force output from these effects is generated by a sensor feedback (servo) loop on the device, they are called "closed loop" effects herein, and can also be referred to as "conditions." Some devices may not be able to output kinesthetic haptic effects that provide resistance to a user object or housing in its degrees of freedom, but may still be able to output closed-loop forces that are dependent on user object or device position. For example, some tactile devices may output forces on the housing of a device but cannot output resistance forces in the degrees of freedom of motion of a manipulandum or the device.

Actual Processing

When creating an emulator processor to operate on behalf of a device, it has been found that "open loop" types of effects are very good candidates for processing by the emulation layer. These types of effects are generally a function of time only and the force value content of these force effects is not based on changing manipulandum positions in real time. Because of this, the emulation layer (or other host layer) can easily compute the force output for each effect at the current time as well as in advance for all times until the effect's completion. This allows the computation of a buffer of force values into the future that are simply fed into the streaming channel to the device. This allows the host system to emulate these types of effects without any degradation in the quality of the effect generation and without requiring any device processing.

"Closed loop" types of effects are far more complicated. These effects are strongly dependent on the sensor values that are measured on the device itself. If the emulation layer on the host system is going to compute the force output for these effects, the data from the sensor readings needs to be transferred from the device to the host system before the force effect can be computed. This presents several issues:

1. The input reporting of the device sensor data to the host should not be accomplished through a streaming channel. It could be performed this way, but it greatly increases the burden on both the host and device systems.
2. "Closed loop" effects cannot be accurately computed for future time values. This results from the fact that it is usually not possible to accurately predict the motion of the user manipulandum when the user is interacting with it.
3. As the delay between reading a sensor value and using the data in a computation of a "closed loop" effect increases, the stability and quality of the effect execution is greatly decreased. This is because closed loop effects are essentially small servo loops requiring rapid updates to maintain quality of feel and prevent instability.
4. Generally the operating system or communication device driver requires the output streaming channel to be continuously filled (see discussion above). Because of this, at least two transfer requests frequently must be kept pending to the device at all times (or the requests are interleaved at least part of the time, as shown in FIG. 3). The requirement of multiple pending transfer requests can greatly increase the latency between the time the effect force values are computed and the time where the force values are actually transferred to the device.

As a result of these factors, the quality of "closed loop" effects that are emulated from the host system will be significantly lower than if the effects are actually computed on the device itself. Because this reduction in quality is very perceptible to a user, it is often more attractive to compute the outputs for closed loop effects on the device itself using a local microcontroller such as a microprocessor.

These factors lead to a preferred embodiment of the hybrid system of the present invention where the actual processing is shared between the host system and the device based on the types of effects being generated. Those effects that are directly dependent on the sensor values in the device are computed on the device, while those effects that are essentially time dependent are processed by the host system. This leads to the shared processing, or hybrid, system architecture. Herein, the term "host effects" indicates those effects to be computed on the host (e.g. by the emulation layer), and the term "device effects" indicates those effects to be computed on the device (which are closed loop effects in a preferred embodiment).

In a preferred method, the application program sends haptic commands down through the hierarchy of host levels as shown in FIG. 2, e.g. a command to output a force as commanded by the application program 102 can be translated to the appropriate forms to each successive layer of the host operating system. At some point, the emulation layer receives the command. Since the emulation layer is emulating a device, the layer above the emulation layer believes it is outputting the haptic command (or other device command) to the device itself. The haptic commands can be such instructions as: "create" to create a new force effect (and its parameters) in the memory of the device; "parameter" command to load one or more new parameters in device memory for a loaded effect or otherwise modify a loaded effect; "destroy" to remove an effect from device memory; "play" to output a particular effect stored in device memory; or other instructions that may instruct the device to delay the output of a force effect by a designated time period, combine two or more force effects, or perform other tasks.

If a particular command is for a device effect, then the emulation layer sends the command to the device so that the local microcontroller can store the effect and compute force values at the time of output (or before output, if the device has enough memory to store force value data). If a command is for a host effect, then the emulation layer processes the command. For a create command, the emulation layer can store the created effect in a device memory model provided in host memory, as explained below. The emulation layer can compute force values for host effects in one of two ways (or a mixture of these methods to achieve more efficiency). In a first method, the emulation layer computes force values when a "create" command or a parameter command is received from an application program. The force values are then stored on the host until they are commanded to be played, at which point they are sent out to the device. In a second method, the emulation layer can compute the force values when a "play" command is received, where the force values are sent out to the device (or buffered) as they are computed. If the device computes force values when a create or parameter command is received, there is a possibility that the effect is never played, and the computation would have then been wasteful of processing availability of the device. However, if the force values are computed at the time of playing the command, performance will be slightly less due to the computational resources required at the time values are output. Once the emulation layer computes the force values, they are streamed to the device to be output in real time, as described above.

Some effects may be a combination of the sensor based computations and other computations. For example, it may be possible to command a damping force that is only active when the device is operating in a specific range of its motion. Thus, for example, the computation of a force value for the damping force is based on the current velocity of the user manipulandum, and whether the damping force is to be computed at all is determined by the location of the manipulandum, e.g. whether the manipulandum is in a predefined damping region of the device workspace/displayed graphical environment. In such a case, "hybrid effects" can be used, where the emulation processor may partially assist the device in handling the output. For example, in one embodiment the device may be capable of generating that damping force output, but may be unable to gate (turn on or off) this damping output based on the position of the device. In this instance, the emulator can, for example, interpret input position reports that are received from the device and use this information to turn the damping force on and off. This allows the damping effect output to remain stable (and have good quality) and still only be effective in the region of interest without having the device perform unnecessary processing to determine the location of the region of interest and determine when to output effects.

It may sometimes be desirable to handle the all the force computations, including closed loop effects, on the host system even though there is a greater reduction in the quality of haptic feedback sensations. This embodiment leads to the greatest reductions in the processing power required for the device microcontroller and therefore the greatest reduction in device cost. In this type of design, efforts must be made to limit, as much as possible, the delay between reading the sensor data on the device and generating the force output requests. One method to help reduce this lag is the introduction of an input streaming pipe to the communications. This pipe allows the device to send information about its sensor values very rapidly and very often to the host system. Isochronous transmissions, for example, are intended for this type of transfer. This type of communication channel helps to reduce the lag introduced on the inbound transfers from the device.

However, even with the input streaming channel, there is still a delay in the output channel. One of the primary contributors to this results from the need to keep the output streaming channel full of data. There may be a way to minimize this delay, but it is not likely to be an "approved" method, i.e. it may not be according to established standards or may not be robust in some applications. One way this would work is to modify or update data after it has been submitted to the communication driver.

Once a transfer buffer has been submitted for transfer to the device, it technically no longer belongs to the haptic feedback driver. However, it may still be feasible to modify the contents of the data buffer even though the haptic feedback driver has relinquished the data. This may allow the haptic feedback driver to update the streaming data with far less latency before it is sent to the device. In this way, lower overall latency and improved performance for closed loop effects may be achieved.

Figure 4:
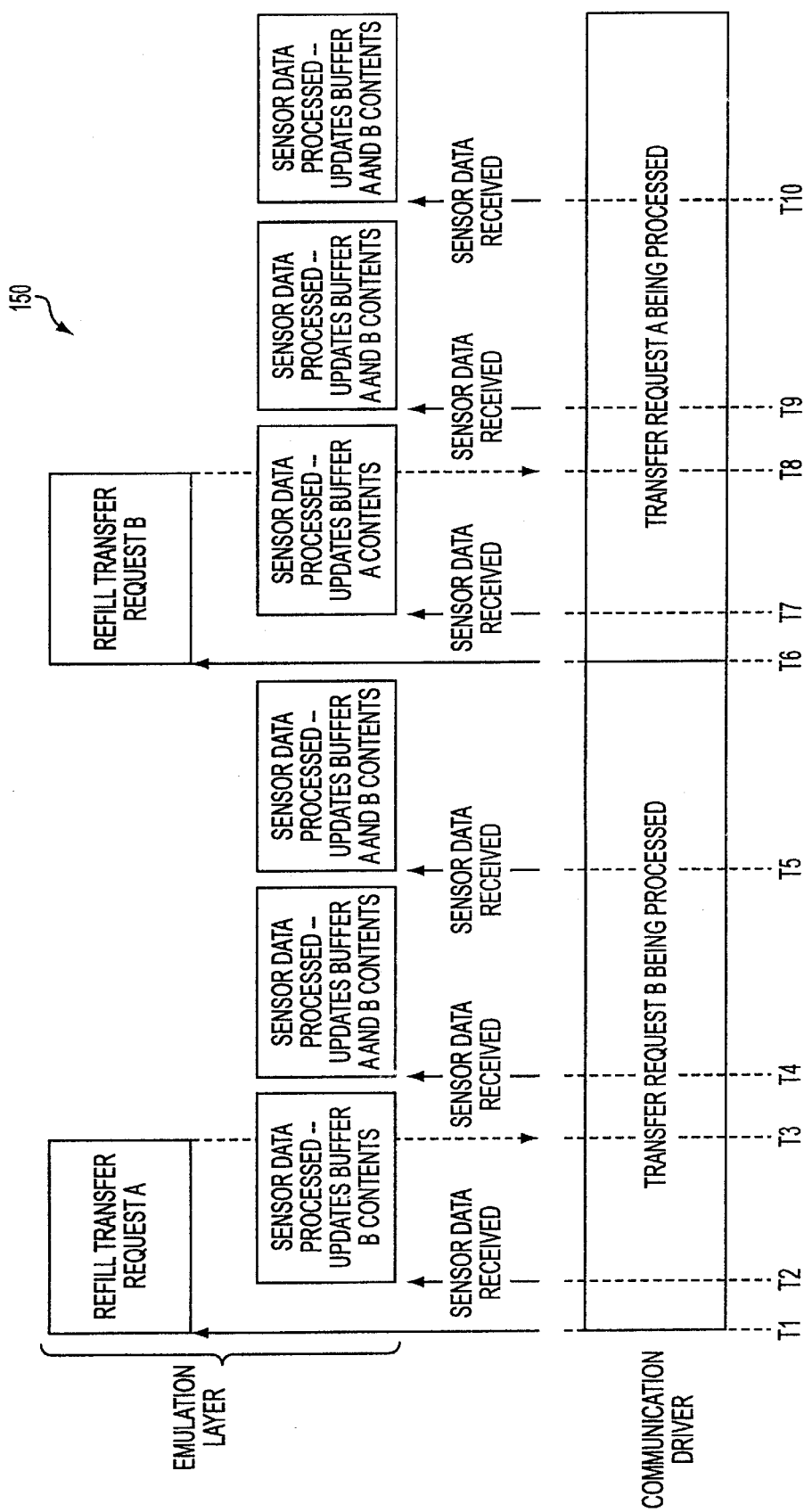
FIG. 4 is a block diagram illustrating an embodiment for modifying a transfer buffer of the host to achieve improved streaming performance.

For example, FIG. 4 is a block diagram 150 showing one such embodiment of modifying the buffer. Initially, a Transfer Request A and B are submitted, as shown in FIG. 3 (not shown in FIG. 4). At time T1 of FIG. 4, a request to refill buffer A with a new Transfer Request A is submitted by the communication driver to the emulation layer while Transfer Request B starts to be processed by the communication driver. The emulation layer begins to refill Transfer Request A. At time T2, sensor data from the device is reported to the host computer describing the position (and/or velocity, etc.) of the user manipulatable object on the device, and the communication driver receives this sensor data and sends it to the emulation layer. The emulation layer processes the received sensor data to determine if the already-submitted force values in buffer B should be modified to correlate with the sensor data. If so, buffer B is modified accordingly. Buffer A is not so modified, however, since it is currently being refilled with a new transfer request until time T3. At time T4, Transfer Request B is still being processed and output by the communication driver, and sensor data is again received from the device. The emulation layer determines if data in both buffer A and buffer B should be changed in accordance with the sensor data. Both buffers may be changed since no refill processing is occurring by the emulation driver. Addition changes to the buffers can be made at additional time points, such as time T5.

At time T6, Transfer Request B has finished processing by the communication driver, and the communication driver indicates this to the emulation layer. The emulation layer begins refilling Transfer Request B in buffer B while the communication driver begins processing and outputting Transfer Request A. Similarly to time T2, at time T7 sensor data is received, and only buffer A is updated if appropriate since buffer B is being written to. At time T8 the refill operation is complete, so that at times T9 and T10 when sensor data is again received, both buffers A and B may be modified if appropriate.

Hybrid Control of Open-Loop Forces

As described above, an implementation of a "hybrid" system provides the host computer to compute some types of force values and stream the values down to the device, so that the device simply outputs the force values to the actuators of the device to provide force output. The host can stream the data to the device using, for example, a serial communication bus such as USB or the like, or other type of communication link or channel. The local microprocessor, however, computes force values for other types of force sensations and controls the actuators without any need of further host computer processing once a high level host command is received. In a preferred embodiment, the host computer determines and streams force values to the device for open-loop, primarily time-based effects, while the local microprocessor computes and controls output forces for closed-loop, position-based effects.

Another aspect of the present invention can divides the tasks of the host computer and local microprocessor yet further. Instead of the host computer determining and streaming all open-loop force effects, the host computer can only determine "low frequency" open-loop effects and send those effects to the device. "High frequency" open-loop effect force values are determined and output by the local microprocessor, once a command from the host computer has been received by the local microprocessor instructing the output of the high frequency effect. If a particular embodiment also provides closed loop effects such as dampers, springs, and spatial textures, then those effects are preferably computed and controlled by the local processor (although in alternate embodiments, some or all of such closed loop effects can be provided and streamed from the host computer).

The control of high frequency open-loop effects may in many embodiments be more appropriate for the local microprocessor to handle than the host. Since the force values in a high frequency effect are changing rapidly, the host computer may not be able to send the values across the communication link to the device as quickly as desired to maintain the fidelity or frequency of the effect. This may especially be the case if a low-bandwidth or high-latency communication link between host computer and interface device is used. Low frequency open-loop effects, however, are changing more slowly and thus allow force values to be streamed more effectively from the host system across the communication link to the device.

One way to determine the difference between "low frequency" and "high frequency" open-loop effects, in a described embodiment, is to compare the frequency of a force effect with a predetermined threshold frequency; those open-loop effects having a frequency below the threshold are "low frequency," and those having a frequency above are "high frequency." For example, an application program running on the host computer might determine that a 200 Hz periodic vibration (an open-loop effect) is to be output by the haptic feedback device. A driver or other program on the host (e.g., the "emulation layer" as described above) can compare the frequency parameter of the commanded vibration to the threshold frequency, which might be set at 50 Hz, for example. Since the effect's frequency is over the threshold, the effect is considered a high frequency open-loop effect, and therefore the computation of the force values for the effect is performed by the local microprocessor. The driver thus simply sends a high level vibration command to the local microprocessor with appropriate parameters, and the local microprocessor decodes the command, computes the force values for output, and sends those values to the actuator(s). If the frequency were under the threshold, the emulator (or other program layer on the host) knows that the host should be computing the force values and streaming them to the device for output, and does so as described above. In other embodiments, the distinction between low frequency and high frequency open loop effects can be determined in other ways or according to different or additional criteria. For example, a command or parameter of a force effect might directly designate that effect as high frequency or low frequency, as predetermined by a developer or user.

This division of labor between local microprocessor and host computer allows the local microprocessor to be reduced in complexity and therefore leads to a reduced cost for the haptic feedback device. For example, in some types of haptic devices, the local microprocessor can be simplified to handle only one force effect at a time. Since the host computer can stream data to the local microprocessor at the same time the local microprocessor is controlling its own force effect, two simultaneous force effects can effectively be output, even with such a simplified local processor. For example, one common force effect in tactile devices is the simultaneous (superimposition) of two vibration effects, one vibration having a high frequency and one vibration having a low frequency. In the present invention, such simultaneous output of two vibrations is possible even when using a simplified processor, where the local microprocessor computes the content for the high frequency vibration and the host computes and streams the content for the low frequency vibration. Similarly, the host can stream a low frequency open-loop effect simultaneously with the control and output of a closed-loop effect handled by the local microprocessor in those devices capable of closed-loop effects. Preferably, the local microprocessor performs a summation of locally-determined effect values and force values received from the host computer to determine a final total force value to output from the actuator(s) of the haptic interface device.

It should be noted that other types of force effects can be selectively handled by the host computer in a hybrid embodiment, if desired. For example, the host computer might be designated to compute and stream force values only for obstruction and/or texture closed-loop force effects, or for all closed-loop effects, as well as the low-frequency open-loop effects described above. The computation of force values for other subcategories of effects can be divided between host and local microprocessor as desired.

In other embodiments, the interface device need not have the capability of outputting closed loop effects such as springs or damping. For example, many tactile devices such as particular gamepads or mice can only output vibrations or pulses to the user through the housing, and spring and damping forces in the degrees of freedom of the user manipulandum cannot be output. The present invention is still applicable in such an embodiment, where the host streams force values for low frequency vibrations and the local microprocessor computes force values for high frequency vibrations. For example, gamepad tactile devices or mouse tactile devices moveable in a planar workspace can be used in hybrid systems, such as those disclosed in application Ser. No. 09/585,741 and U.S. Pat. No. 6,211,861, incorporated herein by reference in their entirety.

Device Memory Handling

Device memory management becomes important when providing haptic feedback effects, since the memory on the device is typically limited in size, thereby limiting the type and number of effects which can be output by the device. When using an emulation layer, however, the emulator can potentially use the relatively large amount of host computer memory to store effects. Thus, if some effects are processed and stored by the emulator while some effects are processed and stored by the device, issues arise as to when an effect can be played and when an effect will not be played due to memory restrictions.

For the consumer haptic feedback devices available at present, there are two memory management methods in use. The first is a "host-managed" method. For the devices that support this method, the device will indicate how much memory it has available and the host system is then responsible for dealing with the allocation and usage of this memory. The host maintains a model of the device memory in host memory and can thus determine when device memory has space available for new effects, what effects are currently playing, etc. This saves communication between device and host since the host knows when new effects can be loaded to the device without having to request and receive a memory status update from the device. This type of method is described in greater detail in copending U.S. Pat. Nos. 6,300,936 and 6,252,583, both of which are incorporated herein by reference in their entirety.

The other method is "device-managed" method, in which the host does not maintain its own model of device memory. Devices that support this method of operation require that host request an allocation of memory on the device for each effect that is created. The device receives the request and, if there is memory available, assigns a handle or ID number to the created effect and then provides that ID value to the host (such as the haptic feedback driver or application program) so that the host can reference and command that effect in device memory (to play it, destroy it, etc.). The host is also responsible for communicating to the device when the host no longer needs the memory for each effect. While the host managed architecture requires some extra processing by the host system to keep track of the device memory, it greatly reduces the complexity and volume of the communication with the device as well as the complexity of the device itself when compared with a device managed architecture.

If the emulation driver is operating on behalf of a device that supports device managed memory for its effects, then there are no real complications for a hybrid system. In this case, the device will inform the host when enough memory is available for an effect being created on the device and when memory is full. The emulation layer can receive the device messages and simply relay them to a higher level program, such as a haptic feedback driver or application. Thus, the emulation layer can allow device-effect requests to transfer to and from the device without any changes, i.e., no changes to those effects that the emulation layer is not processing and implementing. For host effects that the emulation layer is implementing, the emulation layer needs to provide the handle or identification (ID) values to identify the host effects.

The main complication is that the emulation layer needs to ensure that its memory ID values do not overlap with the values the device is using. This overlap can easily be avoided by having the emulation layer "wrap" all the ID values to make sure no values overlap, and perform some translation for the messages that are actually sent to the device to avoid the overlap. For example, if the emulation layer assigns a host effect an ID of 2, and then the device assigns an ID of 2 to a device effect, there may be an overlap problem. The value for the host effect cannot be changed since in typical embodiments there is no method for telling the haptic feedback driver (or application) that the ID has been modified. Instead, the emulation layer can map the ID of the device effect to a different "mapped" ID, such as "n," which is reported to the upper level driver and to the application in some form. When messages from the upper drivers or programs reference an effect having an ID value of "n," the emulator can look up the n value (e.g. in a look-up table) and determine that it identifies the device effect having a device ID value of 2. The emulator then modifies the message before it is sent to the device so that an ID value of 2 is used and so that the device can reference the correct effect in its memory. Such mappings can be handled in a variety of ways, including providing special values which are known to be mapped, or mapping all values.

A more difficult situation exists when an emulation driver is used to share the processing with a device that supports the host managed model. The problem is that since some of the effects are actually implemented by the device itself, the emulation layer can't report that the device has any more memory than is actually available on the device without risking an invalid effect creation. If, for example, a very limited or inexpensive device is being used which can store only a small number of effects, then to be safe the emulation layer would have to report that only the small amount of memory is available. Then the application program would never command more than the small number of effects which can be held by the device.

Thus, the emulation layer would like to report that it has a lot of memory available to store effects, since that is the case for host effects. However, if the emulation driver were to indicate that a large amount of memory was available, there is nothing that would prevent the host from locating the data for an effect in the upper portions of that large memory space. If this effect were actually a device effect to be handled on the device, it would fail because the data memory associated with that effect is located outside the small valid range of the device memory. The emulation layer could attempt to "remap" the effects that are actually transferred to the device so that it would fit in device memory, but this would lead to further problems. First, the emulation driver would have a difficult time determining when device memory has been freed and is available (unlike the device-managed memory model). This would prevent the emulation driver from doing any "cleanup" activities on the device memory. Also, since the host software cannot know how much of the enumerated memory is actually available on the device, it could attempt to create more effects than the device can support. If all of these effects were device effects that needed to be loaded to the device to execute (e.g. they were closed loop effects), then it is impossible for this to occur. Because the host software would assume it has complete knowledge of the device, it would not be able to know that the effect creations had failed.

One method of avoiding this problem is to allow the emulation layer to simulate an interface using the device-managed method for the device. If the emulation driver enumerates the device to the operating system in this manner, then any software accessing the device will know to use device-managed communication methods to control the device. When host effects are created that are implemented by the emulation layer, the emulation processor will handle the allocating and releasing of whatever memory it requires to implement the effects. If device effects are created, the emulation layer will need to handle the processing for the device memory management. In these cases, the emulation layer will be required to remap the effect id values in outbound messages from the controlling software to the actual memory offsets on the device before the messages are sent to the device, since the device expects to receive actual memory offsets and not effect id values. Even though the host software will need to execute the additional communication required for a device managed interface, this should not add any significant delays since these requests are all handled in the emulation driver and do not require any actual communication exchange with the device itself. If too many effects are commanded, the emulation layer will know this based on received device messages and can inform upper level programs that an effect creation has failed.

Descriptor Processing

One trend that is becoming increasingly common for computer peripheral devices is to provide the ability for peripherals to enumerate their capabilities to the host system. When this enumeration is standardized, the host software can be made flexible enough that it will be able to handle many different devices with different capabilities dynamically without having to be programmed specifically for each device. An example of an existing standard that allows peripherals to enumerate their abilities in this manner is the Human Interface Device (HID) Class specification for USB devices. Using this specification, devices can describe how they provide data to host systems and how they expect to receive data in a very standard manner. The HID specification is further supplemented by other usage documents, such as the Physical Interface Device (PID) Class specification for USB devices, which define other standard information, such as information related to haptic feedback, that devices can use in communications with host systems. The information that describes the communication capabilities of the device is commonly called a "descriptor."

When an emulation driver is used to enumerate a descriptor for a device, the situation is more complicated. Some devices may have no descriptor information at all. In these cases, the emulation driver needs to provide a complete descriptor for the device. For this to occur, the emulation driver must be able to at least identify what device is connected using, for example, standard vendor ID and product ID values.

If a haptic feedback device of limited capabilities provides its descriptor to the host system, it may enumerate only a small number of reports. As a simple example, say the descriptor for the device only describes two reports: one is the position input report from the device to the host (describing a position or motion of a user manipulatable object) and the other is an output report received by the device that allows the host to command raw forces to the device actuators. If the emulation layer is operating in this system, then the descriptor for the device must be changed (before it is reported to operating system) to describe the further capabilities that are made possible through emulation. If the emulation layer is made flexible to handle multiple devices, then it can be required to build the new descriptor that is to be reported to the operating system. This new descriptor will need to combine the input report information (describing the device's actual position report) as well as the additional output reports (for the functionality that is handled by the emulation processor). Creating this descriptor will require that the emulation driver be able to extract at least a portion of the descriptor that is returned from the device in order to build the complete descriptor for the device that includes the emulated functionality. An alternative to this approach allows the emulation driver to generate the complete descriptor as it would have to do for devices that had no descriptor information, i.e., create a new descriptor regardless if the device already provides a (limited) descriptor. The emulation layer still needs to extract relevant information from the reported descriptor; or, a "hard coded" descriptor (e.g. appropriate for the type of device, manufacturer, model, etc.) which is stored on the host accessible to the emulation driver can be used while ignoring any description information reported by the device.

Computational Methods

Because of the significant architectural differences between desktop computers and the microcontrollers commonly used in peripherals such as interface devices, new methods for computing the force output are enabled. The microcontrollers that are commonly employed in most low cost computer peripherals tend to be under serious cost restrictions. Because of this, they are not only limited in their processing capabilities, but they are usually restricted to only a very small amount of data memory (RAM). In order to maximize the number of effects that the device can store and play, each effect must be described using only a small number of control parameters. For example, a period type of effect (say a sine wave) might be stored on the device as only the data for its magnitude, period, direction, duration, etc., rather than being stored as a series of points or values, which requires much more memory. From the stored parameters, the device computes the force value at each time step of its playback by knowing how much time has expired for the effect. While this functions correctly, the device will end up computing the same force values several different times if the effect is played for a time that is longer than its period.

The host system is not generally subject to the same constraints as the device microcontroller. In addition to having much more processing capacity, the host system also contains far more memory (RAM). This may allow the host processing to be more efficient. Instead of recalculating the same values multiple times (e.g. for each period of a periodic wave), the host can compute the repeated values once and store the result; a stored value can then be quickly retrieved for the next time it is required to be output or otherwise used. In order for this method to operate effectively, the effects that are being computed must be repetitive over time.

One way this computation/storage can be handled is by performing the computations for each time step of the period as they occur during the first period of the effect playback, e.g. a cycle of computing a value, storing the value, and outputting the value to the device, and then doing the same for each successive value of the initial period. As subsequent periods of the effect are repeated, the stored values can be used to generate the output. An alternative approach would be to precompute and store one entire period of force values for the effect when the command to load the effect parameters is received from the host software. Then, during output, stored values are retrieved, even for the first period of the effect. This method can reduce the chance of the host missing an output period during the first effect period, but may significantly increase the time required to process the outbound message.

Another issue with this computation approach is that the processing for an effect may need to include some combination of retrieving a stored value for the given time step and a real time computation to get the final force output value. This would be the case, for example, when computing the output of a periodic effect that has an envelope applied. An envelope is a modification of a force effect based on a desired "shape" that the developer wishes to obtain, e.g. a ramp up and ramp down (fade out) at the beginning and ends of a periodic waveform. While the frequency/period of such a periodic effect remains the same, the envelope alters the magnitude of the effect at different points in time during the effect. In such a case, the raw values used in the computation of the periodic output could be precomputed or stored during the first period of execution. However, if the effect had any significant duration, it would be very costly (in terms of memory requirements) to compute and store the force values for the entire effect.

While storing the force values for a single period of an effect will help reduce the processing load on the host system, there are also other methods that can be used to reduce the processing. One method is to have a variable computation rate for different effects, e.g. different types of effects (vibration vs. spring force, etc.), different frequencies. of effects, etc. For example, a high speed periodic effect, such as a 100 Hz sine wave, would require very rapid force computations in order to achieve high quality force output. However, a slower periodic (or other type) effect may not require such rapid computations. When processing an effect, the emulation layer can be designed to adapt its processing rate for each effect. For a slowly changing force effect, less computations can be made for every unit of time, i.e., there can be more time elapsed between successive computations. This will result in a reduction of processing loading on the host system without a degradation in the output quality.

If the adaptive processing rate method is combined with the storage of samples for one effect period, the usage of memory on the host system can also be reduced. For example, say that a ½ Hz sine wave force is to be produced. If the output for this force were to be computed every millisecond, then 2,000 sampled points would be needed to define a single period of the effect. However, if a new force sample is computed only every 8 milliseconds, then only 250 samples need be computed and stored to describe the complete effect. In systems where the resolution of the force commands is low (say, 8 bit values), there would be no perceptible degradation in the quality of the force output. When the computation rate is changed for an effect, this rate must be kept track of for each effect in order to know for how long each force sample value should be applied.

Dual Mode Devices

With the possibility of force value streaming, a device is enabled that can handle two modes of functionality. In the first mode, the device would handle all of the effect processing. If a microcontroller used in the device is scaled back from those typically used in currently-available devices, then this device would potentially have reduced capabilities and performance from the current devices. Thus, for example, the device may have less memory and thus can output fewer effects at once and/or fewer types of effects, and the force sensations that are output may have less quality or realism. However, in this mode, the processing requirements on the host computer would be minimized.

In the second mode of operation, the device can be enabled for hybrid operation. It is still enabled to handle all the effects processing that it could handle in the first mode, and would also be able to accept streamed force information from the host system. The host emulation processor could then work to balance the force processing effectively between the host processor and the device. This can increase the quantity (in terms of the number of concurrent effects) and quality of the force output that is possible with the device. In some embodiments, the division of the processing between the host system and the device can be varied in this mode. This variation may be controlled automatically by the emulation driver (with the emulation driver capping its consumption of host processor usage), a different driver, or by a host application program, or through a user preference or software setting.

A central ability of the dual mode device is to be able to effectively balance the force processing distribution in such a way that the output quality is maximized while the impact on the host system performance is minimized. Some characteristics, parameters, and other aspects of the system that can be adjusted to achieve this balance include the time granularity of the effects output on the device (effects having less time per successive force output have greater resolution and greater quality but require more processing); the host processor loading (the host may be able to compute some or all of a particular type of force effect, relieving the device microprocessor but potentially adding delay and loss of quality); and device capability consideration (different devices have different capabilities and some may be able to particular effects better than other devices based on the hardware of the device). Some of these balancing methods, such as the time granularity of forces, could be balanced in all hybrid systems.

In some embodiments, the balancing can be performed automatically by lower level host software such as the emulation layer which can examine a device's capabilities using the descriptor or other information received from the device, examine current host processor loading, or other factors to arrive at a balancing level. Also, an application program or high level driver could handle the balancing. For example, a game program might only use certain types of effects which are simple and of generally high quality, and thus the processing loading on the host can be reduced. In addition, the balancing can be adjusted by the user through a software interface control panel or the like, where the user may desire a certain level of quality and host performance in a particular application or in general.

Another characteristic of the haptic feedback system that can be adjusted in some embodiments to balance processing is the period of the streaming data sent from host to device. The streaming data can, for example, be sent once per millisecond to the device to be output, or can be sent 8 times per millisecond. The smaller the period, the greater the fidelity and quality of the force sensations based on that data. To provide balancing, the host can preferably select one of a plurality of different periods at which to send the data, based on factors such as the processing load of the host and the capabilities of the device. For example, if the host is particularly burdened with processing at a particular time, then the emulation layer (or other driver) can select a longer period, thus causing lower quality haptic feedback to be output but reducing the processing burden on the host. On the other hand, if a particular system has a high bandwidth interface between host and device and the device is more sophisticated, then a lower period can be selected to increase the quality of haptic feedback. In some embodiments, a device can send information to the host to indicate at which speeds/periods it may receive data, and the host driver can select from the available periods. Also, the host application and/or user can in some embodiments select particular streaming periods or provide conditions to adjust the period.

Caching

Another feature that may be enabled by emulation processing is "effect caching." This type of caching allows the host computer to store some effects which have been commanded to be output to the device when the device's memory is fall. Since the host usually has more memory than the device, the host can store (cache) effects, at a low hierarchical level, which the device is not able to store and can send the cached effects to the device when they are to be played or output. In this scheme, the application program and other higher software levels believe that the cached effects have been created and stored on the device. This requires less memory to be provided on the device and reduces device cost. This method is described in greater detail in U.S. Pat. No. 6,252,583, which is incorporated herein by reference in its entirety. That application discussed implementing effect caching at a higher level than the preferred level for the emulation layer described herein; however, there may be some significant advantages to performing the actual implementation of effect caching at the lower level of the emulator; for example, there is less computational overhead when communicating with the device. If the emulator is implementing the effect caching, then the device preferably appears as "device-managed" (rather than using the host-managed method) to the operating system to easily allow the emulation layer to handle the processing for device effects as explained above.

Recovery from Data Transfer Errors

Most of the following embodiments are related to gracefully handling the recovery for data transfer errors or crashes of the host system during haptic feedback operation.

Interpolation for "Missing" Force Streaming Reports

When the host system is performing emulation for a haptic feedback device using a serial data bus to transfer the data, there is a strong possibility that some of the messages that are sent from the host to the device may be corrupted. When the device receives a corrupted packet, it has no choice but to reject any data that may be included in the message. This can happen to any type of transfer messages, but it represents a more significant issue when messages are transferred using an isochronous data channel. Since isochronous data channels are designed to favor timely delivery of messages as opposed to a guaranteed delivery without errors, messages sent on this channel are not resent if an error occurs.

Because of this lack of resending ability, there will be situations where the device needs to generate a force output for a new time step without having received new (or uncorrupted) data from the host system. There are several different methods the device can employ to generate a force on such occasions. One of the simplest methods to handle this is for the device to simply reuse the last force value it received. In many cases, this will work without a problem. If the time variance of the force output is slow relative to the period between force streaming values, then the force samples will be close to one another and the user will not detect that an error has occurred. However, if the force value is changing rapidly relative to the force streaming period, using this method will result in a discontinuity in the effect output. At a minimum, this will result in an incorrect effect output on the device. In addition, this behavior may actually decrease the stability of the system. For example, if an output force effect has a high frequency and a high magnitude, then missing samples can generate unintended longer periods in the output force waveform.

One alternative to outputting this discontinuity is to have the device extrapolate the force output based on the last series of force values it received. In this case, the device may be able to closely estimate the force values for those times that it receives corrupted data from the host system. This would help reduce the discontinuity of the force output on the device. For example, if the device were receiving successive values in an arithmetic or geometric series (or approximately so), the device could determine the next value in the series. Alternatively, especially if successive values are based on a more complex relationship, the host can transmit a delta value to the device, which the device applies as a time step (or adds to a time step) until a new delta value is received from the host.

Redundant Data Transfers

An alternate approach to handling missed or corrupted data transfers is to encode redundant data into each of the streaming data packets. If, for example, force output values with a period of 1 ms are streaming, then size of each packet that is sent can be doubled, and the force values for this millisecond as well as the force values for the next millisecond can be included in each packet. Then, if the message for the next millisecond were corrupted, the device would be able to use the data that was sent in the previous data packet to get the correct force output without discontinuity. This method is described in greater detail in U.S. Pat. No. 5,959,613, which is incorporated herein by reference in its entirety.

Device Shutdown if Stream is not Maintained

Another consideration when using force streaming is that the host system may experience a failure after it has commanded a force output to the device. When this happens, the device may be left in a state where the last command received from the host system commanded a non-zero output and the device will be generating a force output. Since no more commands will be received from the host system until it restarted, the output force may remain indefinitely. This can present safety problems for the user if the output force is strong, or present problems for the device, such as overheating of actuators.

In order to prevent this situation, the device may implement an internal timer that may only allow each force sample to remain active for a short period of time. As new streaming messages are received from the host system, this timer can be continually reset. As long as the timer period is longer than the actual period between received force samples, the device would continue to generate the force outputs. However, if this timer were to expire before a new force value is received, then the device would detect this as a communication failure with the host system and the force output would be terminated until new messages are received from the host system.

Furthermore, once communication is reestablished and force output resumed, the force can be "ramped" up smoothly from a zero or low value to its original value to avoid any sudden jump in force magnitude to the user. Such a ramping force is described in greater detail in U.S. Pat. Nos. 5,734,373 and 5,691,898, both incorporated herein by reference in their entirety.

Streaming Processing with Devices Having Kinematics

Some of the more complicated haptic feedback devices have relatively complicated kinematics, where complex mechanisms are required in order to generate efficient force output to the user. The kinematics equations allow motion of various members of a mechanical linkage connected to the user manipulandum to be translated into motion of the manipulandum in desired degrees of freedom, such as x, y, and z directions. For example, the mechanisms described in U.S. Pat. No. 6,166,723 is a relatively simple mechanism requiring kinematics. The mechanism described in U.S. Pat. No. 5,828,197 is a much more complicated device requiring complex kinematics.

One aspect of the device processing that would likely not shift to the host system or emulator is the kinematics processing. Instead, all the devices can handle their own kinematics computations and exchange data and commands with the host system using only Cartesian coordinates (or any other required coordinates). While this does require more local processing power for the microcontrollers on complex devices, the benefit of this approach is that the host software sees a uniform interface no matter what devices are connected to the system.

While this invention has been described in terms of several preferred embodiments, it is contemplated that alterations, permutations and equivalents thereof will become apparent to those skilled in the art upon a reading of the specification and study of the drawings. Furthermore, certain terminology has been used for the purposes of descriptive clarity, and not to limit the present invention. It is therefore intended that the following appended claims include all such alterations, permutations, and equivalents as fall within the true spirit and scope of the present invention.

What is claimed is:

1. A haptic feedback interface device in communication with a host computer, said host computer running and displaying a graphical environment, said haptic feedback interface device comprising:
   a user manipulatable object physically contacted by a user and moveable in at least one degree of freedom;
   at least one actuator operative to output forces, said forces felt by said user;
   at least one sensor operative to detect motion of said user manipulatable object in said at least one degree of freedom and outputting a sensor signal indicative of said motion; and
   a device processor coupled to said at least one actuator and to said at least one sensor and local to said haptic feedback interface device, said processor operative to output force values to said at least one actuator to control said forces and receive said sensor signal from said at least one sensor, wherein said processor is operative to determine a closed loop force value based at least in part on said sensor signal and output said closed loop force value to said at least one actuator, and wherein said processor does not compute open loop force values but instead is operative to receive open loop force values from said host computer and direct said open loop force values to said at least one actuator, wherein said forces output by said at least one actuator are based on said closed loop force values and said open loop force values.

2. A haptic feedback interface device as recited in claim 1 wherein said open loop force values are computed on said host computer.

3. A haptic feedback interface device as recited in claim 1 wherein said open loop force values include periodic forces.

4. A haptic feedback interface device as recited in claim 1 wherein said open loop force values are received from said host computer over a streaming serial communication channel provided between said haptic feedback interface device and said host computer.

5. A haptic feedback interface device as recited in claim 1 wherein said closed loop forces include spring forces, damping forces, and texture forces.

6. A haptic feedback interface device as recited in claim 4 wherein said streaming channel is an isochronous channel.

7. A haptic feedback interface device as recited in claim 4 wherein said processor extrapolates a force value if a force value received from said host computer is corrupted or missing.

8. A haptic feedback interface device as recited in claim 4 wherein said processor outputs a previously-received force value if a force value received from said host computer is corrupted or missing.

9. A haptic feedback interface device as recited in claim 4 wherein said processor accesses a timer, said timer running for a time period starting when a force value is received from said host computer, wherein if said time period reaches a length greater than a predetermined length, a current force output is terminated, said predetermined length being a known length of time at least as long as a time required to receive a successive force value over said streaming channel.

10. A haptic feedback interface device as recited in claim 1 wherein said processor computes kinematics which convert said sensor signal to coordinates in a coordinate system.

11. A method for providing haptic feedback functionality on a host computer in a hybrid system including said host computer and a haptic feedback interface device, the method comprising:
    receiving on a driver of said host computer a command to provide a force effect, said command provided by an application program running on said host computer;
    determining whether said commanded force effect is an open loop effect or a closed loop effect;
    if said commanded force effect is a closed loop effect, directing force information based on said command to said haptic feedback device to allow said haptic feedback device to compute force values for said closed loop effect; and
    if said commanded force effect is an open loop effect, storing information associated with said command in memory of said host computer;
       computing a force value of said open loop force effect by said driver using said information associated with said command; and
       providing said force value to said haptic feedback device to allow said haptic feedback device to output said force value as a force to a user of said haptic feedback device.

12. A method as recited in claim 11 wherein said driver is a low level emulation driver, functioning below an operating system and above a communication driver on said host computer.

13. A method as recited in claim 11 wherein said open loop effects are based primarily on time, and wherein said closed loop effects are based at least in part on a current position of a user manipulandum on said haptic feedback device.

14. A method as recited in claim 11 wherein a plurality of said force values for said open loop effect are provided to said haptic feedback device using a streaming channel.

15. A method as recited in claim 14 wherein said streaming channel is an isochronous channel.

16. A method as recited in claim 14 wherein said streaming channel is a Universal Serial Bus channel.

17. A method as recited in claim 14 wherein said streaming channel is a FireWire channel.

18. A method as recited in claim 11 wherein said command is a command to create said force effect in memory, and wherein said computing is performed when said force effect is to be output, wherein said computed force value is output to said device when a command to output said effect is received.

19. A method as recited in claim 11 wherein said command is a command to create said force effect in memory, wherein said computing is performed when said create command is received, wherein said computed force value is output to said device when a command to output said effect is received.

20. A method as recited in claim 11 wherein said driver emulates a haptic feedback device so that said application program sends said command as if it were sending said command to a haptic feedback device.

21. A method as recited in claim 11 wherein said force value is provided to said haptic feedback device over a streaming channel, and wherein said channel is kept continuously full of streaming data by providing a transfer request to a communication driver on said host computer while said communication driver is outputting data from a previous transfer request to said haptic feedback device.

22. A method as recited in claim 11 wherein said driver manages a memory model for said haptic feedback device and can determine when memory of said haptic feedback device is full or available.

23. A method as recited in claim 22 wherein said driver caches closed loop effects in host memory which cannot fit in device memory and provides a particular one of said cached closed loop effects to said device when said particular cached effect is commanded to be output by said device.

24. A method as recited in claim 11 wherein when said open loop effect is a repeating force effect, said driver computes a force value for an initial period of said effect, stores said force value, and retrieves said stored force value when outputting said value in successive periods of said effect.

25. A method as recited in claim 24 further comprising adjusting said stored force value based on an envelope that modifies a magnitude of said repeating force effect.

26. A method as recited in claim 11 wherein said driver stores created effects for said device in memory of said host computer in said memory model using effect caching, said memory model able to store a greater number of said effects than memory of said device.

27. A method as recited in claim 11 wherein said streaming force value is repeated in a successive packet sent to said haptic feedback device to allow error correction at said haptic feedback device.

28. A force feedback interface device, said device in communication with a host computer, said host computer running and displaying a graphical environment, said force feedback interface device comprising:

a user manipulatable object physically contacted by a user and moveable in at least one degree of freedom;

at least one actuator operative to output forces felt by said user;

at least one sensor operative to detect motion of said user manipulatable object in said at least one degree of freedom and outputting a sensor signal indicative of said motion; and a device processor coupled to said at least one actuator and to said at least one sensor and local to said force feedback interface device, said processor operative to output signals to said at least one actuator to control said forces and receive said sensor signal from said at least one sensor, wherein said processor is operative to determine a force value for a high frequency open loop effect based at least in part on a command received from said host computer, and wherein said processor does not determine force values for low frequency open loop effects and is operative to receive force values for low frequency open loop effects from said host computer, said processor operative to direct said force values for said high frequency open loop effects and low frequency open loop effects to said at least one actuator.

29. A force feedback interface device as recited in claim 28 wherein said force values for said high frequency open loop effects and low frequency open loop effects define a vibration force effect.

30. A force feedback interface device as recited in claim 29 wherein said vibration force effect is a periodic force effect.

31. A force feedback interface device as recited in claim 28 wherein said processor outputs force values from said high frequency open loop effects simultaneously with outputting force values for low frequency open loop effects received from said host computer.

32. A force feedback interface device as recited in claim 31 wherein said processor sums force values from said high frequency open loop effect and from said low frequency open loop effect and outputs a total force value.

33. A force feedback interface device as recited in claim 28 wherein said device processor also determines closed loop force values based at least in part on a position of said user manipulatable object in said degree of freedom.

34. A force feedback interface device, said device in communication with a host computer, said host computer running and displaying a graphical environment, said force feedback interface device comprising:

a user manipulatable object physically contacted by a user and moveable in at least one degree of freedom;

at least one actuator operative to output forces, said forces felt by said user;

at least one sensor operative to detect motion of said user manipulatable object in said at least one degree of freedom and outputting a sensor signal indicative of said motion; and a device processor coupled to said at least one actuator and to said at least one sensor and local to said force feedback interface device, said processor operative to output signals to said at least one actuator to control said forces and receive said sensor signal from said at least one sensor, wherein said processor is operative to determine a closed loop force value based at least in part on said sensor signal and outputs said closed loop force value, and wherein said processor does not compute any low frequency open loop force values and is operative to receive low frequency open loop force values from said host computer and direct said open loop force values to said at least one actuator.

35. A force feedback interface device as recited in claim 34 wherein said low frequency open loop force values describe a vibration having a frequency under a threshold frequency, and wherein said processor determines high frequency open loop values which describe a vibration having a frequency over said threshold frequency.

36. A force feedback interface device as recited in claim 34 wherein said open loop forces are computed on said host computer.

37. A force feedback interface device as recited in claim 34 wherein said open loop forces include periodic forces.

38. A force feedback interface device as recited in claim 34 wherein said open loop force values are received from said host computer over a streaming serial communication channel coupling said force feedback interface device to said host computer.

39. A force feedback interface device as recited in claim 37 wherein said closed loop forces include spring forces and damping forces.

40. A method for providing force feedback functionality on a host computer in a hybrid system including said host computer and a force feedback interface device, the method comprising:

receiving on a driver program of said host computer a command to provide a force effect, said command provided by an application program running on said host computer;

determining whether said commanded force effect is a high frequency open loop effect or a low frequency open loop effect;

if said commanded force effect is a high frequency open loop effect, directing force information based on said command to said force feedback device to allow said force feedback device to compute force values for said high frequency open-loop effect and output said force values as forces to said user; and if said commanded force effect is a low frequency open loop effect,
storing information included with said command in memory of said host computer;
computing a force value of said low frequency open loop force effect by said driver using said information included with said command; and
providing said force value to said force feedback device to allow said force feedback device to output said force value as a force to a user of said force feedback device.

41. A method as recited in claim 40 wherein said low frequency open loop effect is a vibration having a frequency under a threshold frequency, and wherein said high frequency open loop effect is a vibration having a frequency over said threshold frequency.

42. A method for providing force feedback functionality on a host computer in a hybrid system including said host computer and a force feedback interface device, the method comprising:

receiving on a driver program of said host computer a command to provide a force effect, said command provided by an application program running on said host computer;

determining whether said commanded force effect is an open loop effect or a closed loop effect;

if said commanded force effect is a closed loop effect or a high frequency open-loop effect, directing force information based on said command to said force feedback device to allow said force feedback device to compute force values for said closed loop effect or said high frequency open-loop effect; and if said commanded force effect is a low frequency open loop effect,
storing information included with said command in memory of said host computer;
computing a force value of said low frequency open loop force effect by said driver using said information included with said command; and
providing said force value to said force feedback device to allow said force feedback device to output said force value as a force to a user of said force feedback device.

43. A method as recited in claim 42 wherein said low frequency open loop effect is a vibration having a frequency under a threshold frequency, and wherein said high frequency open loop effect is a vibration having a frequency over said threshold frequency.

44. A haptic feedback interface device in communication with a host computer, said host computer running and displaying a graphical environment, said haptic feedback interface device comprising:

at least one actuator operative to output forces, said forces felt by a user of said haptic feedback interface device;

at least one sensor operative to detect manipulation of said haptic feedback interface device by said user and outputting a sensor signal indicative of said manipulation; and a processor in communication with said at least one actuator and said at least one sensor, said processor operative to output force values to said at least one actuator to control said forces and receive said sensor signal from said at least one sensor, wherein said processor is operative to determine a closed loop force value based at least in part on said sensor signal and output said closed loop force value to said at least one actuator, and wherein said microcontroller does not compute open loop force values but instead is operative to receive open loop force values from said host computer and direct said open loop force values to said at least one actuator, wherein said forces output by said at least one actuator are based on said closed loop force values and said open loop force values.

45. A haptic feedback interface device as recited in claim 44 wherein said open loop force values are computed on said host computer.

46. A haptic feedback interface device as recited in claim 44 wherein said open loop force values include periodic forces.

47. A haptic feedback interface device as recited in claim 44 wherein said open loop force values are received from said host computer over a streaming serial communication channel between said haptic feedback interface device and said host computer.

48. A haptic feedback interface device as recited in claim 44 wherein said closed loop forces include spring forces, damping forces, and texture forces.

49. A haptic feedback interface device as recited in 47 claim wherein said streaming channel is an isochronous channel.

50. A haptic feedback interface device as recited in claim 47 wherein said processor extrapolates a force value if a force value received from said host computer is corrupted or missing.

51. A haptic feedback interface device as recited in claim 47 wherein said processor outputs a previously-received force value if a force value received from said host computer is corrupted or missing.

52. A haptic feedback interface device as recited in claim 47 wherein said processor accesses a timer, said timer running for a time period starting when a force value is received from said host computer, wherein if said time period reaches a length greater than a predetermined length, a current force output is terminated, said predetermined length being a known length of time at least as long as a time required to receive a successive force value over said streaming channel.

53. A haptic feedback interface device as recited in claim 44 wherein said processor computes kinematics which convert said sensor signal to coordinates in a coordinate system.

54. A haptic feedback interface device as recited in claim 44 wherein said manipulation of said haptic feedback interface device includes moving at least a portion of said haptic feedback interface device in at least one degree of freedom.

\* \* \* \* \*